US012763007B2

(12) United States Patent
Yu et al.

(10) Patent No.: US 12,763,007 B2
(45) Date of Patent: Oct. 13, 2026

(54) PIXEL CIRCUIT AND ELECTRONIC APPARATUS INCLUDING THE SAME

(71) Applicants: Samsung Display Co., LTD., Yongin-si (KR); IUCF-HYU (Industry-University Cooperation Foundation Hanyang University), Seoul (KR)

(72) Inventors: Byungchang Yu, Yongin-si (KR); Oh Kyong Kwon, Seoul (KR); Kyunghoon Chung, Yongin-si (KR); Youn Sik Kim, Seoul (KR)

(73) Assignees: SAMSUNG DISPLAY CO., LTD., Gyeonggi-Do (KR); IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 0 days.

(21) Appl. No.: 19/216,104

(22) Filed: May 22, 2025

(65) Prior Publication Data

US 2025/0391342 A1 Dec. 25, 2025

(30) Foreign Application Priority Data

Jun. 21, 2024 (KR) ........................ 10-2024-0081006

(51) Int. Cl.
*G09G 3/32* (2016.01)

(52) U.S. Cl.
CPC ......... *G09G 3/32* (2013.01); *G09G 2310/066* (2013.01); *G09G 2310/08* (2013.01);
(Continued)

(58) Field of Classification Search
CPC ............... G09G 3/32; G09G 2310/066; G09G 2310/08; G09G 2320/0242; G09G 2320/064; G09G 2330/021
See application file for complete search history.

(56) References Cited

U.S. PATENT DOCUMENTS

2013/0082906 A1* 4/2013 Toyomura ............ G09G 3/3233 345/55
2013/0083000 A1* 4/2013 Toyomura ............ G09G 3/3233 345/212

FOREIGN PATENT DOCUMENTS

KR 102023232 B1 9/2019
KR 102131266 B1 7/2020
KR 102137636 B1 7/2020

OTHER PUBLICATIONS

Ahn et al., "A driving and compensation method for AMLED displays using adaptive reference generator for high luminance uniformity," IEEE Transactions on Circuits and Systems-II: Express Briefs, vol. 67, No. 10, Oct. 2020, 5 pages.

(Continued)

*Primary Examiner* — Jonathan A Boyd
(74) *Attorney, Agent, or Firm* — CANTOR COLBURN LLP

(57) ABSTRACT

A pixel circuit includes a light emitting element, a first switching element including a control electrode connected to a second node, a first electrode connected to a third node and a second electrode connected to the light emitting element, a second switching element including a control electrode connected to a first node, a first electrode receiving a power and a second electrode connected to the second node, a third switching element including a control electrode receiving the gate signal, a first electrode receiving the data voltage and a second electrode connected to the first node, a driving element including a control electrode receiving a reference (Continued)

voltage, a first electrode receiving the power and a second electrode connected to the third node, a first capacitor receiving the ramp signal and connected to the first node and a second capacitor receiving the emission signal and connected to the second node.

20 Claims, 19 Drawing Sheets

(52) U.S. Cl.
CPC .............. *G09G 2320/0242* (2013.01); *G09G 2320/064* (2013.01); *G09G 2330/021* (2013.01)

(56) References Cited

OTHER PUBLICATIONS

Lee et al., “A 10-Bit 1280×720 Micro-LED Display Driver with 2-Transistor Pixel Circuits and Current-Mode Pulse Width Modulation,” IEEE Solid-State Circuits Letters, vol. 5, 2022, 4 pages.
Mizukami et al., “36.1: 6-Bit Digital VGA OLED,” Society of Information Display 00 Digest, 2000, 4 pages.

* cited by examiner

PIXEL CIRCUIT AND ELECTRONIC APPARATUS INCLUDING THE SAME

This application claims priority to Korean Patent Application No. 10-2024-0081006, filed on Jun. 21, 2024, and all the benefits accruing therefrom under 35 U.S.C. § 119, the content of which in its entirety is herein incorporated by reference.

BACKGROUND

1. Field

Embodiments of the invention relate to a pixel circuit, a display apparatus including the pixel circuit and an electronic apparatus including the pixel circuit. More particularly, embodiments of the invention relate to a pixel circuit driven in a pulse width modulation method, a display apparatus including the pixel circuit and an electronic apparatus including the pixel circuit.

2. Description of the Related Art

Generally, a display apparatus includes a display panel and a display panel driver. The display panel may include a plurality of gate lines, a plurality of data lines and a plurality of pixels. The display panel driver may include a gate driver, a data driver and a driving controller. The gate driver may output gate signals to the gate lines. The data driver may output data voltages to the data lines. The driving controller may control the gate driver and the data driver.

SUMMARY

A conventional pixel circuit driven in a pulse width modulation method may have a relatively long falling time such that it may be very difficult to display low grayscale ranges and a color shift may occur due to a shift in a wavelength of a light emitting element. However, in embodiments of the invention, the current of the light emitting element may be quickly controlled by the second switching element.

In addition, in a conventional pixel circuit driven by changing a level of a high power voltage of the pixel circuit, a switch may be used for each pixel row to switch the high power voltage and a voltage drop (IR-drop) of the high power voltage may occur due to a large turn-on resistance of the switch. However, in embodiments of the invention, the high power voltage may not be switched such that the voltage drop may be effectively prevented.

Embodiments of the invention provide a pixel circuit driven in a pulse width modulation method and quickly controlling a current of a light emitting element.

Embodiments of the invention also provide a display apparatus including the pixel circuit.

Embodiments of the invention also provide an electronic apparatus including the pixel circuit.

In an embodiment of a pixel circuit according to the invention, the pixel circuit includes a light emitting element, a first switching element, a second switching element, a third switching element, a driving element, a first capacitor and a second capacitor. In such an embodiment, the first switching element includes a control electrode connected to a second node, a first electrode connected to a third node and a second electrode connected to an anode electrode of the light emitting element. In such an embodiment, the second switching element includes a control electrode connected to a first node, a first electrode which receives a first power voltage and a second electrode connected to the second node. In such an embodiment, the third switching element includes a control electrode which receives a gate signal, a first electrode which receives a data voltage and a second electrode connected to the first node. In such an embodiment, the driving element includes a control electrode which receives a reference voltage, a first electrode which receives the first power voltage and a second electrode connected to the third node. In such an embodiment, the first capacitor includes a first electrode which receives a ramp signal and a second electrode connected to the first node. In such an embodiment, the second capacitor includes a first electrode which receives an emission signal and a second electrode connected to the second node.

In an embodiment, the first switching element, the second switching element, the third switching element and the driving element may be P-type transistors.

In an embodiment, the gate signal may have an inactive level in a first period. In such an embodiment, the ramp signal may have a minimum level in the first period. In such an embodiment, the emission signal may have an inactive level in the first period.

In an embodiment, the gate signal may have an active level in a second period subsequent to the first period. In such an embodiment, the ramp signal may have the minimum level in the second period. In such an embodiment, the emission signal may have the inactive level in the second period.

In an embodiment, the gate signal may have the inactive level in a third period subsequent to the second period. In such an embodiment, the ramp signal may increase from the minimum level toward a maximum level in the third period. In such an embodiment, the emission signal may have the inactive level in the third period.

In an embodiment, the gate signal may have the inactive level in a fourth period subsequent to the third period. In such an embodiment, the ramp signal may gradually decrease from a maximum level toward a minimum level in the fourth period. In such an embodiment, the emission signal may have an active level in the fourth period.

In an embodiment, a light emission time of the light emitting element may be determined based on the data voltage and a difference between the maximum level of the ramp signal and the minimum level of the ramp signal.

In an embodiment, in a light emission on period, the first switching element may be turned on, the second switching element may be turned off and the light emitting element may emit a light through a current path generated along the driving element, the first switching element and the light emitting element. When the second switching element is turned on by the ramp signal which gradually decreases, the first switching element may be turned off and the light emitting element may stop emitting the light.

In an embodiment, the light emitting element may further include a cathode electrode which receives a second power voltage. In such an embodiment, the ramp signal, the gate signal and the emission signal may vary according to time in the first period to the fourth period. In such an embodiment, the first power voltage, the second power voltage and the reference voltage may be constant in the first period to the fourth period.

In an embodiment, the data voltage may be written to the second electrode of the first capacitor and the light emitting element may emit a light in a writing frame. In such an embodiment, the data voltage may not be written to the second electrode of the first capacitor and the light emitting element may emit the light in a holding frame. In such an embodiment, the gate signal may have an inactive level in a first period of the writing frame. In such an embodiment, the ramp signal may have a minimum level in the first period of the writing frame. In such an embodiment, the emission signal may have an inactive level in the first period of the writing frame. In such an embodiment, the gate signal may have an active level in a second period of the writing frame. In such an embodiment, the ramp signal may have the minimum level in the second period of the writing frame. In such an embodiment, the emission signal may have the inactive level in the second period of the writing frame. In such an embodiment, the gate signal may have the inactive level in a third period of the writing frame. In such an embodiment, the ramp signal may increase from the minimum level toward a maximum level in the third period of the writing frame. In such an embodiment, the emission signal may have the inactive level in the third period of the writing frame. In such an embodiment, the gate signal may have the inactive level in a fourth period of the writing frame. In such an embodiment, the ramp signal may gradually decrease from a maximum level toward a minimum level in the fourth period of the writing frame. In such an embodiment, the emission signal may have an active level in the fourth period of the writing frame.

In an embodiment, the gate signal may have an inactive level in a first period of the holding frame. In such an embodiment, the ramp signal may have a minimum level in the first period of the holding frame. In such an embodiment, the emission signal may have an inactive level in the first period of the holding frame. In such an embodiment, the gate signal may have the inactive level in a second period of the holding frame. In such an embodiment, the ramp signal may have the minimum level in the second period of the holding frame. In such an embodiment, the emission signal may have the inactive level in the second period of the holding frame. In such an embodiment, the gate signal may have the inactive level in a third period of the holding frame. In such an embodiment, the ramp signal may increase from the minimum level toward a maximum level in the third period of the holding frame. In such an embodiment, the emission signal may have the inactive level in the third period of the holding frame. In such an embodiment, the gate signal may have the inactive level in a fourth period of the holding frame. In such an embodiment, the ramp signal may gradually decrease from a maximum level toward a minimum level in the fourth period of the holding frame. In such an embodiment, the emission signal may have an active level in the fourth period of the holding frame.

In an embodiment of a pixel circuit according to the invention, the pixel circuit a light emitting element, a first switching element, a second switching element, a third switching element, a driving element, a first capacitor and a second capacitor. In such an embodiment, the first switching element includes a control electrode connected to a second node, a first electrode connected to a cathode electrode of the light emitting element and a second electrode connected to a third node. In such an embodiment, the second switching element includes a control electrode connected to a first node, a first electrode connected to the second node and a second electrode which receives a second power voltage. In such an embodiment, the third switching element includes a control electrode which receives a gate signal, a first electrode which receives a data voltage and a second electrode connected to the first node. In such an embodiment, the driving element includes a control electrode which receives a reference voltage, a first electrode connected to the third node and a second electrode which receives the second power voltage. In such an embodiment, the first capacitor includes a first electrode which receives a ramp signal and a second electrode connected to the first node. In such an embodiment, the second capacitor includes a first electrode which receives an emission signal and a second electrode connected to the second node.

In an embodiment, the first switching element, the second switching element, the third switching element and the driving element may be N-type transistors.

In an embodiment, the gate signal may have an inactive level in a first period. In such an embodiment, the ramp signal may have a maximum level in the first period. In such an embodiment, the emission signal may have an inactive level in the first period.

In an embodiment, the gate signal may have an active level in a second period subsequent to the first period. In such an embodiment, the ramp signal may have the maximum level in the second period. In such an embodiment, the emission signal may have the inactive level in the second period.

In an embodiment, the gate signal may have the inactive level in a third period subsequent to the second period. In such an embodiment, the ramp signal may decrease from the maximum level toward a minimum level in the third period. In such an embodiment, the emission signal may have the inactive level in the third period.

In an embodiment, the gate signal may have the inactive level in a fourth period subsequent to the third period. In such an embodiment, the ramp signal may gradually increase from the minimum level toward the maximum level in the fourth period. In such an embodiment, the emission signal may have an active level in the fourth period.

In an embodiment, a light emission time of the light emitting element may be determined based on the data voltage and a difference between the maximum level of the ramp signal and the minimum level of the ramp signal.

In an embodiment, in a light emission on period, the first switching element may be turned on, the second switching element may be turned off and the light emitting element may emit a light through a current path generated along the driving element, the first switching element and the light emitting element. In such an embodiment, when the second switching element is turned on by the ramp signal which gradually increases, the first switching element may be turned off and the light emitting element may stop emitting the light.

In an embodiment of a display apparatus according to the invention, the display apparatus includes a display panel, a data driver, a gate emission driver and a ramp driver. In such an embodiment, the display panel includes a pixel. In such an embodiment, the data driver outputs a data voltage to the pixel. In such an embodiment, the gate emission driver outputs a gate signal and an emission signal to the pixel. In such an embodiment, the ramp driver outputs a ramp signal to the pixel. In such an embodiment, the pixel includes a light emitting element, a first switching element including a control electrode connected to a second node, a first electrode connected to a third node and a second electrode connected to an anode electrode of the light emitting element, a second switching element including a control electrode connected to a first node, a first electrode which receives a first power voltage and a second electrode connected to the second node, a third switching element including a control electrode which receives the gate signal, a first electrode which receives the data voltage and a second electrode connected to the first node, a driving element including a control electrode which receives a reference voltage, a first electrode which receives the first power voltage and a second electrode connected to the third node, a first capacitor including a first electrode which receives the ramp signal and a second electrode connected to the first node and a second capacitor including a first electrode which receives the emission signal and a second electrode connected to the second node.

In an embodiment of an electronic apparatus according to the invention, the electronic apparatus includes a display panel, a data driver, a gate emission driver, a ramp driver, a driving controller and a processor. In such an embodiment, the display panel includes a pixel. In such an embodiment, the data outputs a data voltage to the pixel. In such an embodiment, the gate emission driver outputs a gate signal and an emission signal to the pixel. In such an embodiment, the ramp driver outputs a ramp signal to the pixel. In such an embodiment, the driving controller controls the data driver, the gate emission driver and the ramp driver. In such an embodiment, the processor outputs input image data and an input control signal to the driving controller. In such an embodiment, the pixel includes a light emitting element, a first switching element including a control electrode connected to a second node, a first electrode connected to a third node and a second electrode connected to an anode electrode of the light emitting element, a second switching element including a control electrode connected to a first node, a first electrode which receives a first power voltage and a second electrode connected to the second node, a third switching element including a control electrode which receives the gate signal, a first electrode which receives the data voltage and a second electrode connected to the first node, a driving element including a control electrode which receives a reference voltage, a first electrode which receives the first power voltage and a second electrode connected to the third node, a first capacitor including a first electrode which receives the ramp signal and a second electrode connected to the first node and a second capacitor including a first electrode which receives the emission signal and a second electrode connected to the second node.

According to embodiments of the pixel circuit, the display apparatus including the pixel circuit and the electronic apparatus including the pixel circuit, the pixel circuit may include the light emitting element, the first switching element, the second switching element, the third switching element, the driving element, the first capacitor and the second capacitor and may be effectively driven in the pulse width modulation method.

In the light emission on period, the first switching element may be turned on and the second switching element may be turned off such that the light emitting element may emit a light through a current path generated along the driving element, the first switching element and the light emitting element. In such an embodiment, when the second switching element is turned on by the ramp signal which gradually decreases, the first switching element may be turned off and the light emitting element may stop emitting a light.

A conventional pixel circuit driven in a pulse width modulation method may have a relatively long falling time such that it may be very difficult to display low grayscale ranges and a color shift may occur due to a shift in a wavelength of a light emitting element.

In addition, in a conventional pixel circuit driven by changing a level of a high power voltage of the pixel circuit, a switch may be used for each pixel row to switch the high power voltage and a voltage drop (IR-drop) of the high power voltage may occur due to a large turn-on resistance of the switch.

BRIEF DESCRIPTION OF THE DRAWINGS

The above and other features of embodiments the invention will become more apparent by describing in detailed embodiments thereof with reference to the accompanying drawings, in which.

DETAILED DESCRIPTION

Figure 1:
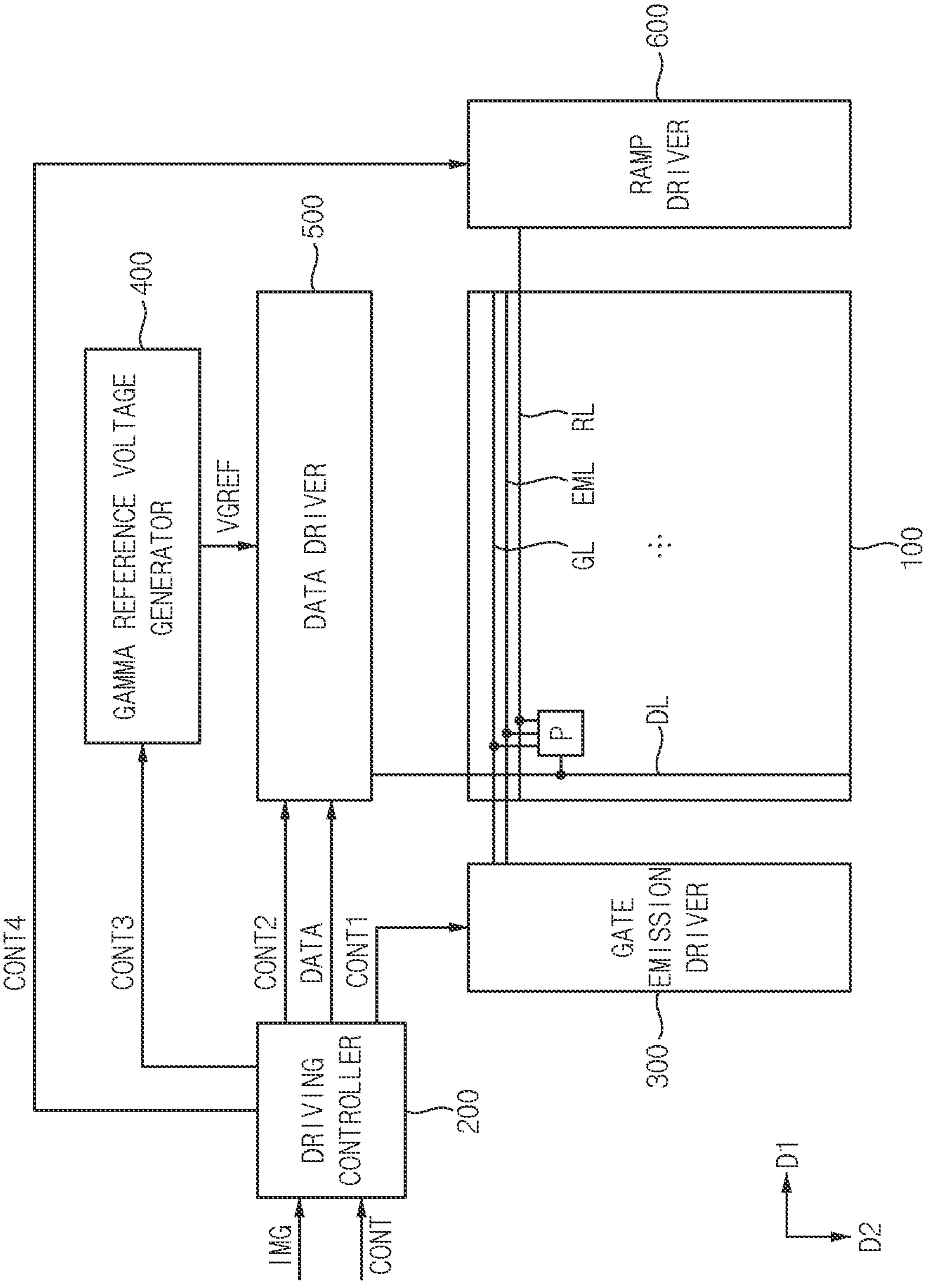
FIG. 1 is a block diagram illustrating a display apparatus according to an embodiment of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. Thus, reference to "an" element in a claim followed by reference to "the" element is inclusive of one element and a plurality of the elements. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings.

FIG. 1 is a block diagram illustrating a display apparatus according to an embodiment of the invention.

Referring to FIG. 1, an embodiment of the display apparatus includes a display panel 100 and a display panel driver. The display panel driver includes a driving controller 200, a gate emission driver 300, a gamma reference voltage generator 400 and a data driver 500. The display panel driver may further include a ramp driver 600.

The display panel 100 has a display region, on which an image is displayed, and a peripheral region adjacent to the display region.

The display panel 100 includes a plurality of gate lines GL, a plurality of emission lines EML, a plurality of ramp lines RL, a plurality of data lines DL and a plurality of pixels P electrically connected to the gate lines GL, the emission lines EML, the ramp lines RL and the data lines DL. The gate lines GL may extend in a first direction D1, the emission lines EML may extend in the first direction D1, the ramp lines RL may extend in the first direction D1 and the data lines DL may extend in a second direction D2 crossing the first direction D1.

The driving controller 200 receives input image data IMG and an input control signal CONT from an external apparatus. In an embodiment, for example, the input image data IMG may include red image data, green image data and blue image data. The input image data IMG may include white image data. The input image data IMG may include magenta image data, cyan image data and yellow image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3, a fourth control signal CONT4 and a data signal DATA based on the input image data IMG and the input control signal CONT.

The driving controller 200 generates the first control signal CONT1 for controlling an operation of the gate emission driver 300 based on the input control signal CONT, and outputs the first control signal CONT1 to the gate emission driver 300. The first control signal CONT1 may include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT, and outputs the third control signal CONT3 to the gamma reference voltage generator 400.

The driving controller 200 generates the fourth control signal CONT4 for controlling an operation of the ramp driver 600 based on the input control signal CONT, and outputs the fourth control signal CONT4 to the ramp driver 600.

The gate emission driver 300 generates gate signals driving the gate lines GL and emission signals driving the emission lines EML in response to the first control signal CONT1 received from the driving controller 200. The gate emission driver 300 may output the gate signals to the gate lines GL. The gate emission driver 300 may output the emission signals to the emission lines EML.

In an embodiment of the invention, the gate emission driver 300 may be integrated on the peripheral region of the display panel 100. In an embodiment of the invention, the gate emission driver 300 may be mounted on the peripheral region of the display panel 100.

In an embodiment, as shown in FIG. 1, the gate signals and the emission signals may be generated from a single driver (e.g., the gate emission driver 300), but the invention may not be limited thereto. In another embodiment, a gate driver for generating the gate signals and an emission driver for generating the emission signals may be independently formed or provided.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA.

In an embodiment, the gamma reference voltage generator 400 may be disposed in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL.

In an embodiment of the invention, the data driver 500 may be integrated on the peripheral region of the display panel 100. In an embodiment of the invention, the data driver 500 may be mounted on the peripheral region of the display panel 100.

The ramp driver 600 generates ramp signals in response to the fourth control signal CONT4 received from the driving controller 200. The ramp driver 600 may output the ramp signals to the ramp lines RL.

In an embodiment of the invention, the ramp driver 600 may be integrated on the peripheral region of the display panel 100. In an embodiment of the invention, the ramp driver 600 may be mounted on the peripheral region of the display panel 100.

In an embodiment, as shown in FIG. 1, the data driver 500 may be disposed on an upper side of the display panel 100, but the invention may not be limited thereto. Alternatively, the data driver 500 may be disposed on a lower side of the display panel 100 or disposed on both of the upper side and the lower side of the display panel 100. Alternatively, the data driver 500 may be disposed on a left side of the display panel 100, disposed on a right side of the display panel 100 or disposed on both of the left side and the right side of the display panel 100.

In an embodiment, as shown in FIG. 1, the gate emission driver 300 may be disposed on the left side of the display panel 100, the invention may not be limited thereto. Alternatively, the gate emission driver 300 may be disposed on the right side of the display panel 100 or disposed on both of the left side and the right side of the display panel 100. Alternatively, the gate emission driver 300 may be disposed on the upper side of the display panel 100, disposed on the lower side of the display panel 100 or disposed on both of the upper side and the lower side of the display panel 100.

In an embodiment, as shown in FIG. 1, the ramp driver 600 may be disposed on the right side of the display panel 100, the invention may not be limited thereto. Alternatively, the ramp driver 600 may be disposed on the left side of the display panel 100 or disposed on both of the left side and the right side of the display panel 100. Alternatively, the ramp driver 600 may be disposed on the upper side of the display panel 100, disposed on the lower side of the display panel 100 or disposed on both of the upper side and the lower side of the display panel 100.

Figure 2:
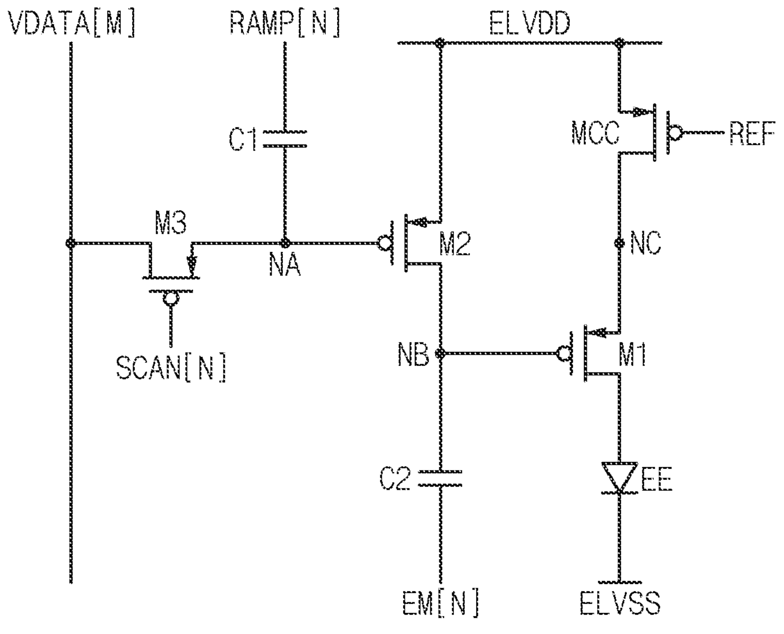
FIG. 2 is a circuit diagram illustrating a pixel circuit of the display panel of FIG. 1.

FIG. 2 is a circuit diagram illustrating a pixel circuit of the display panel 100 of FIG. 1.

Referring to FIGS. 1 and 2, an embodiment of the pixel circuit includes a light emitting element EE, a first switching element M1, a second switching element M2, a third switching element M3, a driving element MCC, a first capacitor C1 and a second capacitor C2.

The light emitting element EE may include an anode electrode connected to a second electrode of the first switching element M1 and a cathode electrode that receives a second power voltage ELVSS.

The first switching element M1 includes a control electrode connected to a second node NB, a first electrode connected to a third node NC and the second electrode connected to the anode electrode of the light emitting element EE.

The second switching element M2 includes a control electrode connected to a first node NA, a first electrode that receives a first power voltage ELVDD and a second electrode connected to the second node NB.

The third switching element M3 includes a control electrode that receives the gate signal SCAN[N], a first electrode that receives the data voltage VDATA[M] and a second electrode connected to the first node NA.

The driving element MCC may be a transistor including a control electrode that receives a reference voltage REF, a first electrode that receives the first power voltage ELVDD and a second electrode connected to the third node NC.

The first capacitor C1 includes a first electrode that receives the ramp signal RAMP[N] and a second electrode connected to the first node NA.

The second capacitor C2 includes a first electrode that receives the emission signal EM[N] and a second electrode connected to the second node NB.

The first power voltage ELVDD and the second power voltage ELVSS may be power voltages for a light emission of the light emitting element EE. In an embodiment, for example, the first power voltage ELVDD may be greater than the second power voltage ELVSS.

In an embodiment, the first switching element M1, the second switching element M2, the third switching element M3 and the driving element MCC may be P-type transistors. In an embodiment, for example, the first switching element M1, the second switching element M2, the third switching element M3 and the driving element MCC may be P-type metal-oxide-semiconductor (PMOS) transistors. In an embodiment, for example, the first switching element M1, the second switching element M2, the third switching element M3 and the driving element MCC may be low temperature polysilicon transistors.

The driving element MCC may supply a constant current to the light emitting element EE. The first switching element M1 may be a switch for controlling a current of the driving element MCC in a pulse width modulation method. The second switching element M2 may be a switch for quickly switching a voltage of the second node NB in response to a change of a voltage of the first node NA. The third switching element M3 may be a switch for applying the data voltage VDATA[M] to the first node NA.

The pixel circuit may control a current flowing through the light emitting element EE by a pulse width modulation signal corresponding to the data voltage VDATA[M] using the ramp signal RAMP[N].

In an embodiment, for example, the light emitting element EE may be a micro light emitting element (micro LED).

Figure 3:
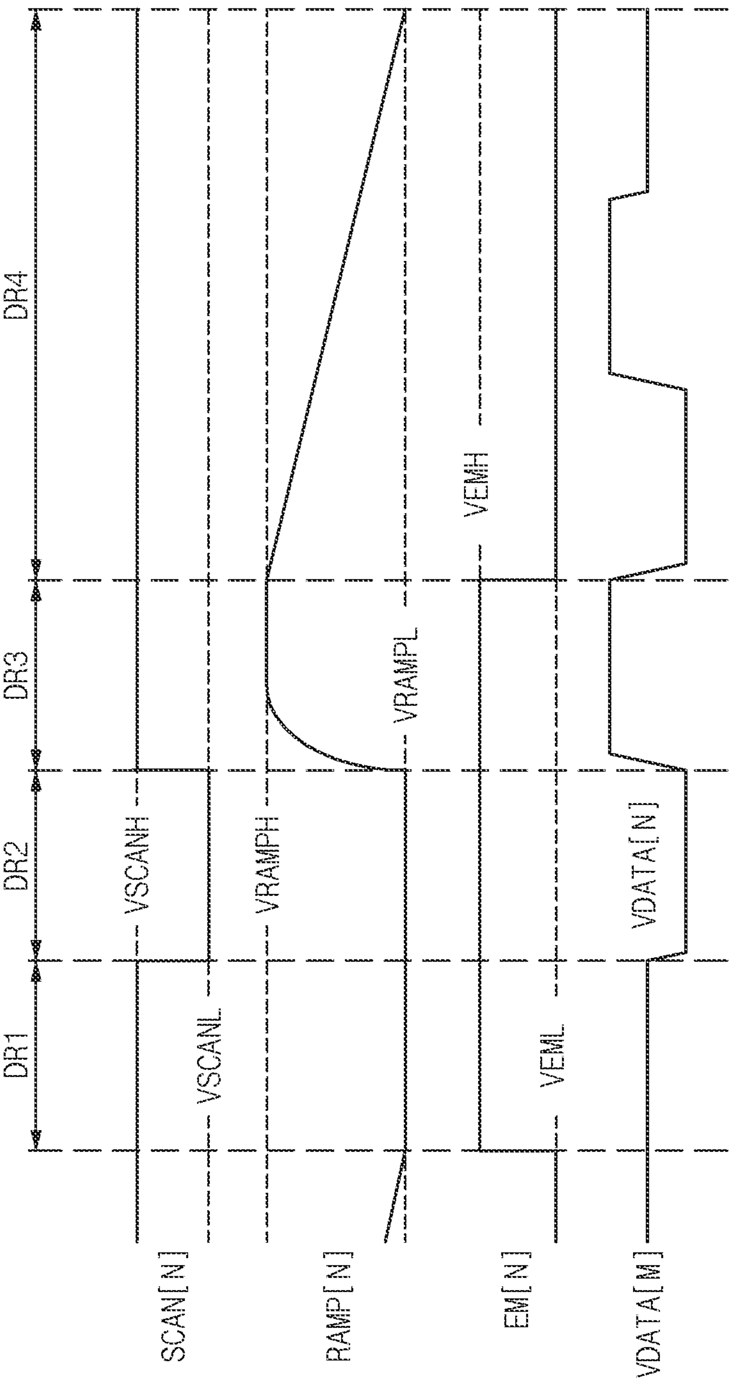
FIG. 3 is a signal timing diagram illustrating input signals applied to the pixel circuit of FIG. 2.

FIG. 3 is a signal timing diagram illustrating input signals applied to the pixel circuit of FIG. 2.

Referring to FIGS. 1 to 3, a driving period of the pixel circuit may include a first period DR1, a second period DR2, a third period DR3 and a fourth period DR4.

The first period DR1 may be an initialization period. In the first period DR1, the voltage of the second node NB may be initialized.

The second period DR2 may be a programming period. In the second period DR2, the data voltage VDATA[M] may be applied to the first node NA.

The third period DR3 may be a maintaining period. In the third period DR3 may be a time for the ramp signal RAMP[N] to increase sufficiently to a maximum level.

The fourth period DR4 may be alight emission period. In the fourth period DR4, the emission signal EM[N] has an active level and the ramp signal RAMP[N] gradually decreases from the maximum level to a minimum level. In a light emission on period of the fourth period DR4, the light emitting element EE may emit a light. In a light emission off period of the fourth period DR4, the light emitting element EE may not emit a light.

Figure 4:
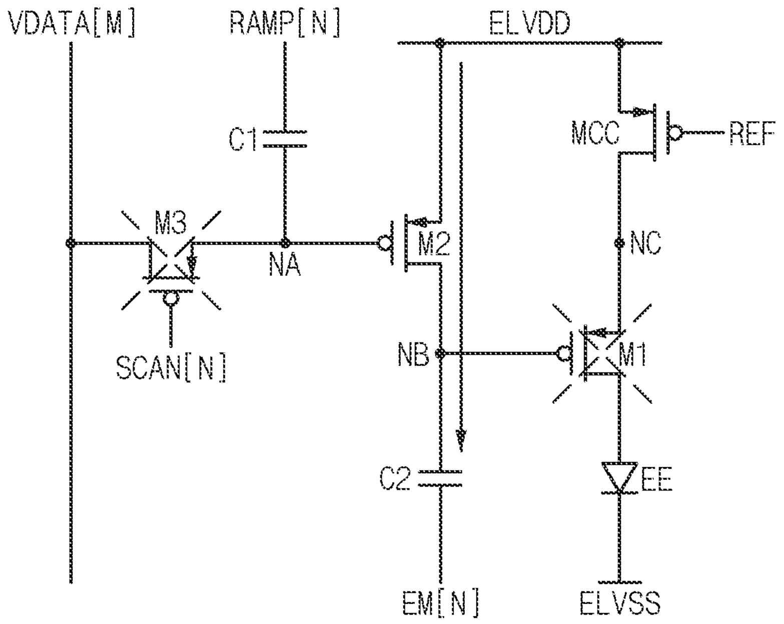
FIG. 4 is a circuit diagram illustrating an operation of the pixel circuit of FIG. 2 in a first period of a driving period.
Figure 5:
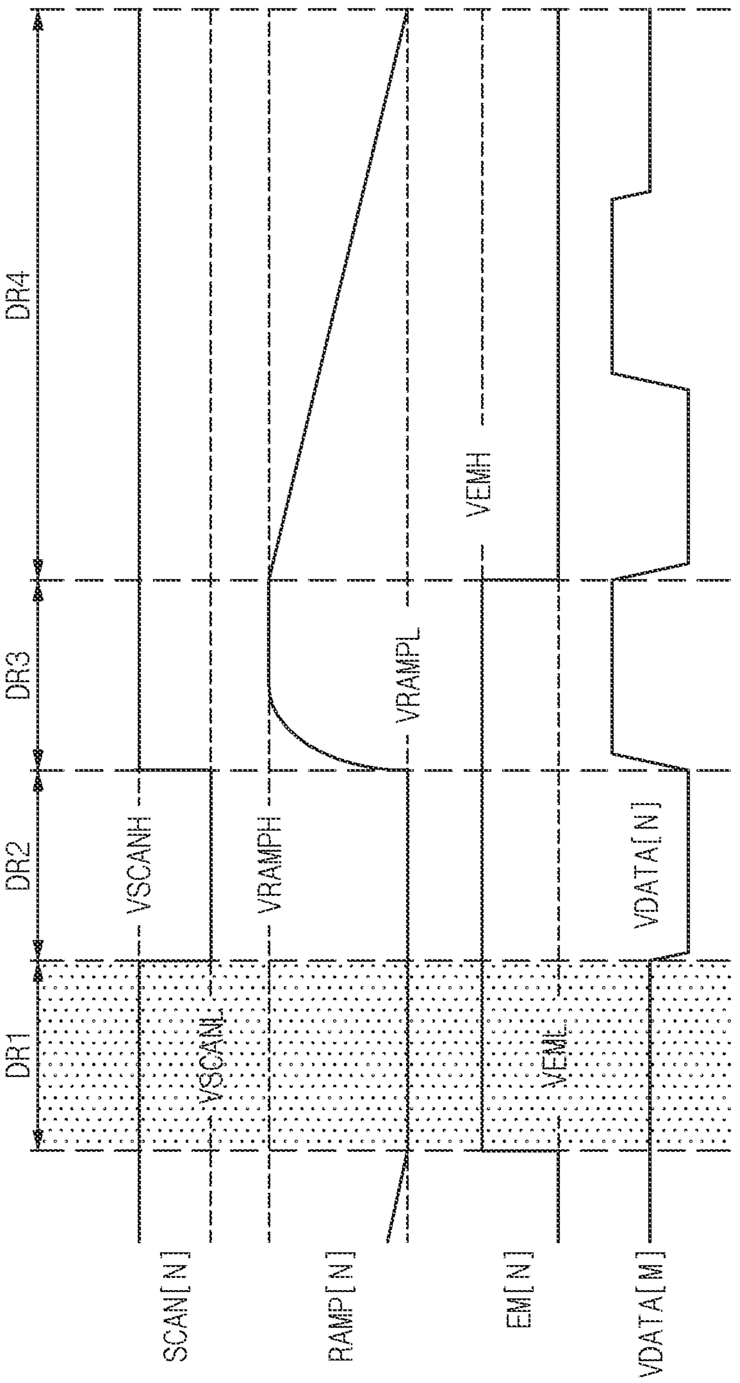
FIG. 5 is a signal timing diagram illustrating the input signals applied to the pixel circuit of FIG. 2 in the first period.

FIG. 4 is a circuit diagram illustrating an operation of the pixel circuit of FIG. 2 in the first period DR1 of the driving period. FIG. 5 is a signal timing diagram illustrating the input signals applied to the pixel circuit of FIG. 2 in the first period DR1.

Referring to FIGS. 1 to 5, in the first period DR1, the gate signal SCAN[N] may have an inactive level VSCANH, the ramp signal RAMP[N] may have a minimum level VRAMPL and the emission signal EM[N] may have an inactive level VEMH.

Herein, [N] may mean an N-th pixel row. The pixel circuit of FIG. 2 that receives the gate signal SCAN[N], the ramp signal RAMP[N] and the emission signal EM[N] may be included in the N-th pixel row.

Herein, [M] may mean an M-th pixel column. The pixel circuit of FIG. 2 that receives the data voltage VDATA[M] may be included in the M-th pixel column.

In an embodiment, where transistors that receives the gate signal SCAN[N], the ramp signal RAMP[N] and the emission signal EM[N] are P-type transistors, active levels of the gate signal SCAN[N], the ramp signal RAMP[N] and the emission signal EM[N] may be low levels and inactive levels of the gate signal SCAN[N], the ramp signal RAMP [N] and the emission signal EM[N] may be high levels. In another embodiment, where transistors that receives the gate signal SCAN[N], the ramp signal RAMP[N] and the emission signal EM[N] are N-type transistors, active levels of the gate signal SCAN[N], the ramp signal RAMP[N] and the emission signal EM[N] may be high levels and inactive levels of the gate signal SCAN[N], the ramp signal RAMP [N] and the emission signal EM[N] may be low levels.

For example, a low level of the gate signal SCAN[N] may be VSCANL and a high level of the gate signal SCAN[N] may be VSCANH.

For example, a low level of the ramp signal RAMP[N] may be VRAMPL and a high level of the ramp signal RAMP[N] may be VRAMPH.

For example, a low level of the emission signal EM[N] may be VEML and a high level of the emission signal EM[N] may be VEMH.

In the first period DR1, the scan signal SCAN[N] has the inactive level VSCANH so that the third switching element M3 may be turned off.

In the first period DR1, the minimum level VRAMPL of the ramp signal RAMP[N] may be maintained, such that a voltage of the first node NA may be sufficient (or low enough) to turn on the second switching element M2.

In an initial portion of the first period DR1, the emission signal EM[N] may be rapidly or instantaneously changed from an active level VEML to the inactive level VEMH and a voltage of the second node NB may be instantaneously increased by the second capacitor C2. In an embodiment, the first power voltage ELVDD is being applied to the second node NB by the second switching element M2 such that the voltage of the second node NB may converge the first power voltage ELVDD in the first period DR1.

In the first period DR1, both of a source voltage of the first switching element M1 and a gate voltage of the first switching element M1 are the first power voltage ELVDD such that the first switching element M1 is turned off and accordingly, a current does not flow through the light emitting element EE.

The reference voltage REF is applied to a control electrode of the driving element MCC and a turned-on state of the driving element MCC may be maintained in the first period DR1 to the fourth period DR4 by the reference voltage REF.

The ramp signal RAMP[N], the gate signal SCAN[N] and the emission signal EM[N] may vary according to time in the first period DR1 to the fourth period DR4. The first power voltage ELVDD, the second power voltage ELVSS and the reference voltage REF may be constant voltages that does not vary according to time in the first period DR1 to the fourth period DR4.

Figure 6:
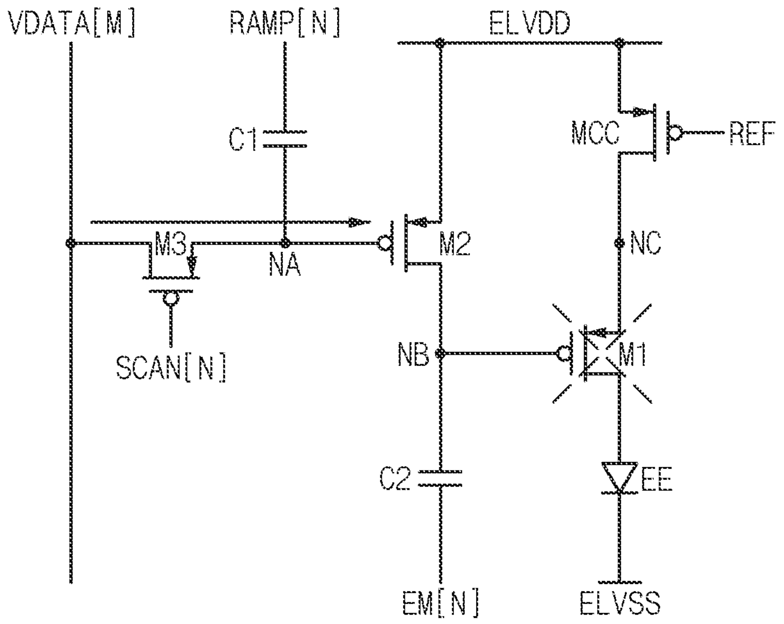
FIG. 6 is a circuit diagram illustrating an operation of the pixel circuit of FIG. 2 in a second period of the driving period.
Figure 7:
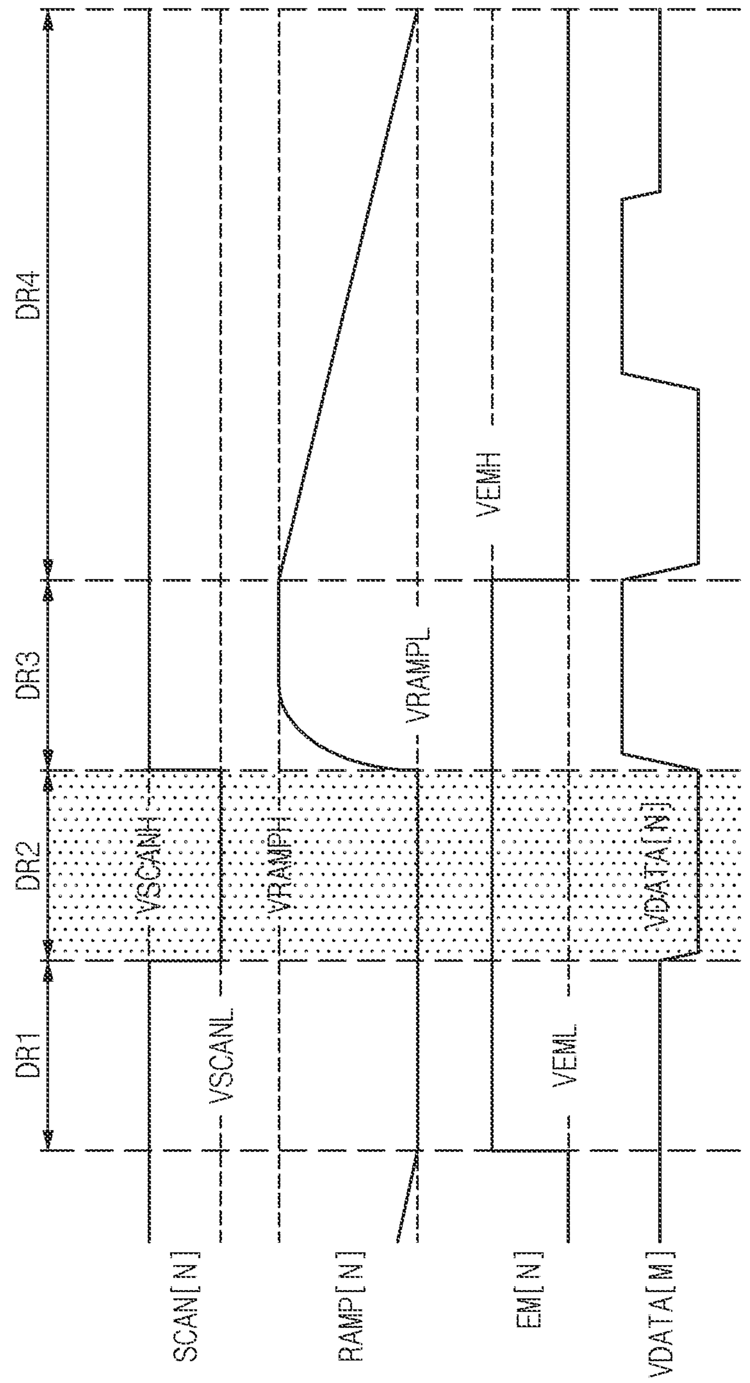
FIG. 7 is a signal timing diagram illustrating the input signals applied to the pixel circuit of FIG. 2 in the second period.

FIG. 6 is a circuit diagram illustrating an operation of the pixel circuit of FIG. 2 in the second period DR2 of the driving period. FIG. 7 is a signal timing diagram illustrating the input signals applied to the pixel circuit of FIG. 2 in the second period DR2.

Referring to FIGS. 1 to 7, in the second period DR2 subsequent to the first period DR1, the gate signal SCAN[N] may have an active level VSCANL, the ramp signal RAMP [N] may have the minimum level VRAMPL and the emission signal EM[N] may have the inactive level VEMH.

In the second period DR2, the scan signal SCAN[N] is changed to the active level VSCANL so that the third switching element M3 may be turned on and the data voltage VDATA[N] may be written to the first node NA.

VDATA[M] represents generalized data voltages applied to the M-th pixel column. VDATA[N] represents the data voltage corresponding to the N-th pixel row among VDATA [M].

In the second period DR2, the minimum level VRAMPL of the ramp signal RAMP[N] may be maintained. Thus, an electric charge corresponding to a difference between the minimum level VRAMPL of the ramp signal RAMP[N] and the data voltage VDATA[N](i.e., VRAMPL−VDATA[N]) may be charged at both ends of the first capacitor C1.

In the second period DR2, both of the source voltage of the first switching element M1 and the gate voltage of the first switching element M1 are the first power voltage ELVDD such that a turned-off state of the first switching element M1 may be maintained.

Figure 8:
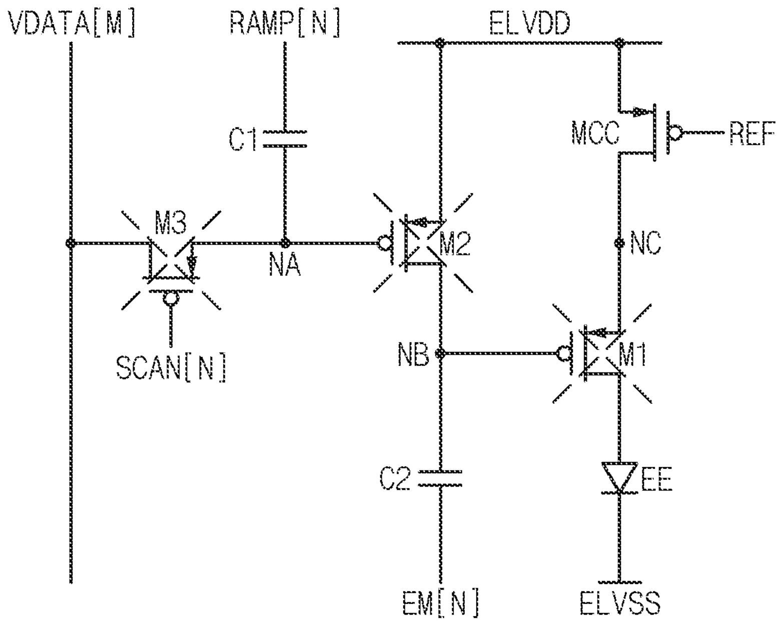
FIG. 8 is a circuit diagram illustrating an operation of the pixel circuit of FIG. 2 in a third period of the driving period.
Figure 9:
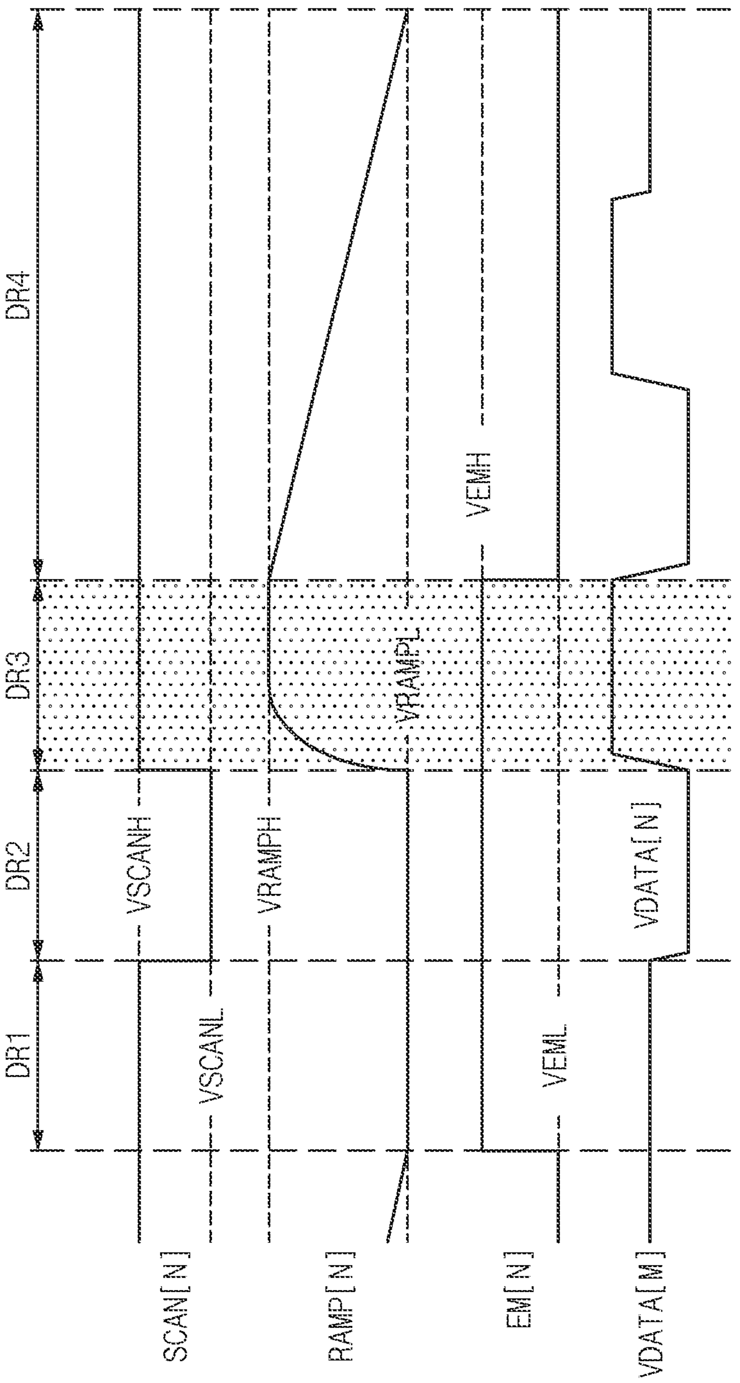
FIG. 9 is a signal timing diagram illustrating the input signals applied to the pixel circuit of FIG. 2 in the third period.

FIG. 8 is a circuit diagram illustrating an operation of the pixel circuit of FIG. 2 in the third period DR3 of the driving timing. FIG. 9 is a signal timing diagram illustrating the input signals applied to the pixel circuit of FIG. 2 in the third period DR3.

Referring to FIGS. 1 to 9, in the third period DR3 subsequent to the second period DR2, the gate signal SCAN [N] may have the inactive level VSCANH, the ramp signal RAMP[N] may increase from the minimum level VRAMPL toward the maximum level VRAMPH and the emission signal EM[N] may have the inactive level VEMH.

In the third period DR3, the scan signal SCAN[N] is changed to the inactive level VSCANH such that the first switching element M1, the second switching element M2 and the third switching element M3 may be turned off.

In an embodiment, for the light emitting element EE to emit a light using a pulse width modulation method, the ramp signal RAMP[N] may increase to the maximum level VRAMPH and then gradually decrease to the minimum level VRAMPL. However, the ramp signal RAMP[N] may not immediately increase to the maximum level VRAMPH due to a performance of the ramp driver 600 and a delay of the ramp line RL. Therefore, the maintaining period DR3 for waiting until a level of the ramp signal RAMP[N] increases to the maximum level VRAMPH without passing to the light emission period DR4. In addition, when the third period DR3 is increased, a driving speed of an output terminal of the ramp driver 600 may be decreased such that a power consumption of the ramp driver 600 may be reduced.

In the third period DR3, when the ramp signal RAMP[N] increases to the maximum level VRAMPH, the voltage of the first node NA may be a sum of the data voltage VDATA[N] and a difference between the maximum level VRAMPH of the ramp signal RAMP[N] and the minimum level VRAMPL of the ramp signal RAMP[N].

Alight emission time of the light emitting element EE may be determined based on the data voltage VDATA[N] and the difference between the maximum level VRAMPH and the minimum level VRAMPL.

Figure 10A:
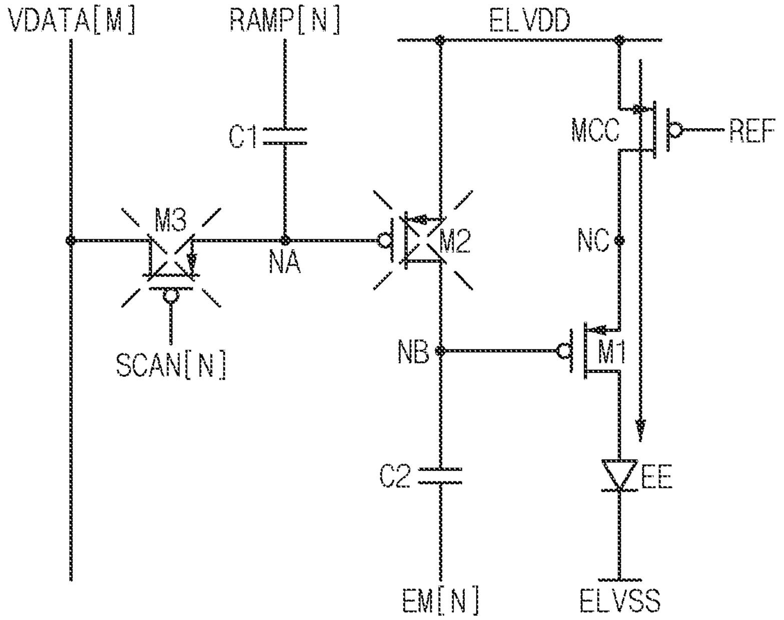
FIG. 10A is a circuit diagram illustrating an operation of the pixel circuit of FIG. 2 in a light emission off period in a fourth period of the driving period.
Figure 10B:
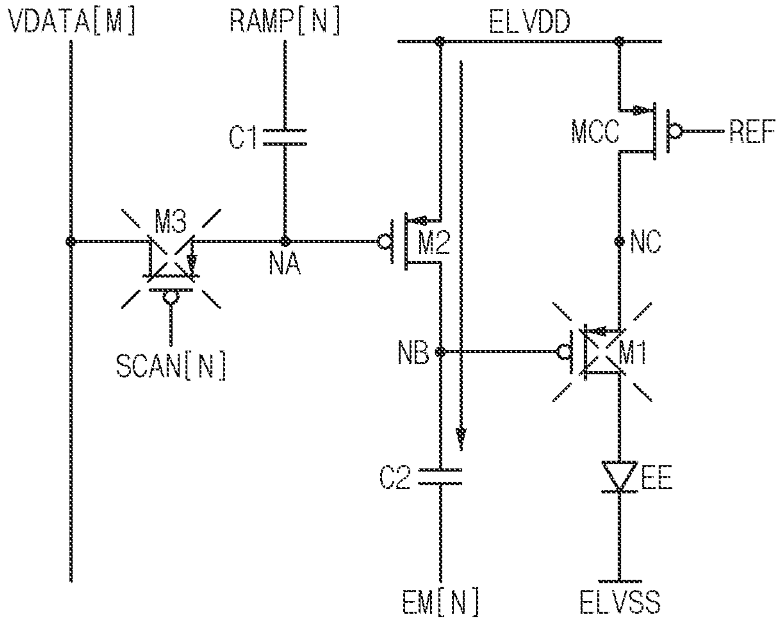
FIG. 10B is a circuit diagram illustrating an operation of the pixel circuit of FIG. 2 in a light emission on period in the fourth period of the driving period.
Figure 11:
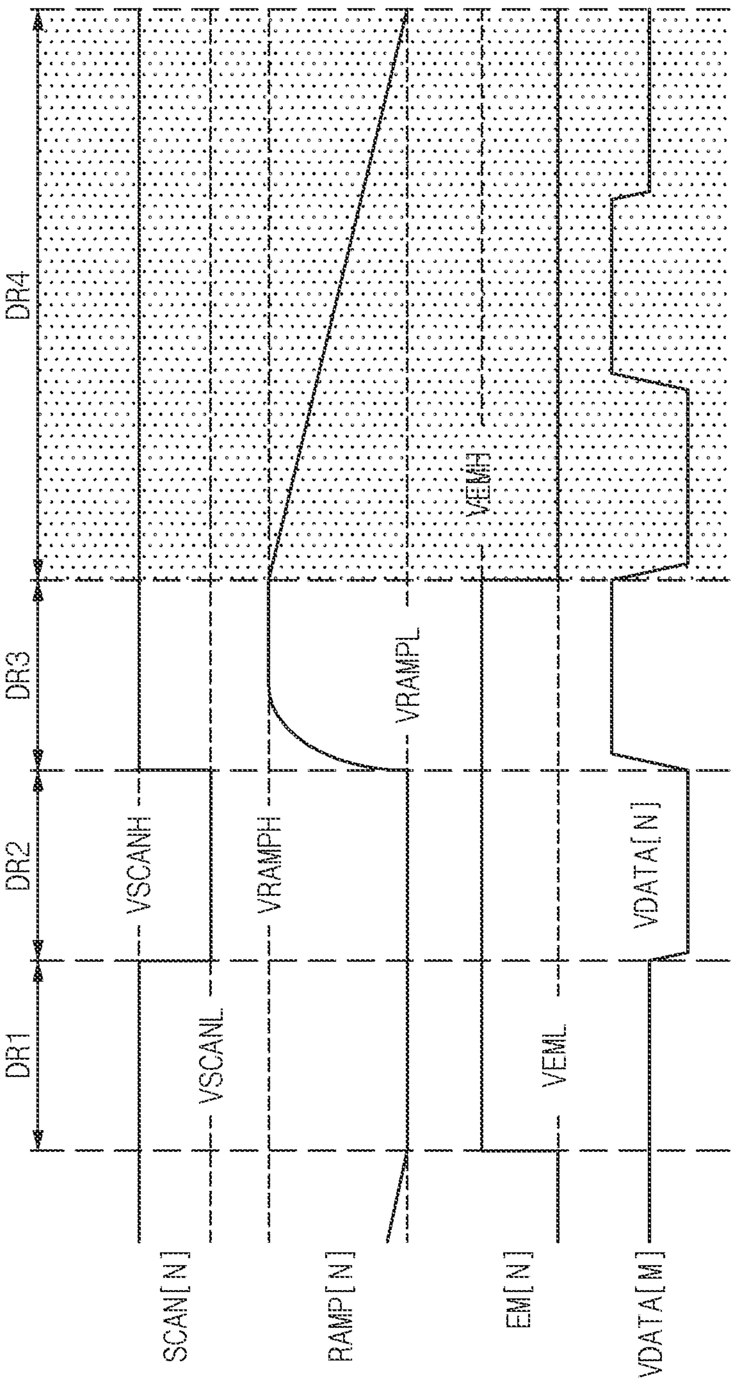
FIG. 11 is a signal timing diagram illustrating the input signals applied to the pixel circuit of FIG. 2 in the fourth period.

FIG. 10A is a circuit diagram illustrating an operation of the pixel circuit of FIG. 2 in the light emission off period in the fourth period DR4 of the driving period. FIG. 10B is a circuit diagram illustrating an operation of the pixel circuit of FIG. 2 in the light emission on period in the fourth period DR4 of the driving period. FIG. 11 is a signal timing diagram illustrating the input signals applied to the pixel circuit of FIG. 2 in the fourth period DR4.

Referring to FIGS. 1 to 11, in the fourth period DR4 subsequent to the third period DR3, the gate signal SCAN [N] may have the inactive level VSCANH, the ramp signal RAMP[N] may gradually decrease from the maximum level VRAMPH toward the minimum level VRAMPL and the emission signal EM[N] may have the active level VEML.

In the light emission on period, the first switching element M1 may be turned on and the second switching element M2 may be turned off such that the light emitting element EE may emit a light through a current path generated along the driving element MCC, the first switching element M1 and the light emitting element EE. When the second switching element M2 is turned on by the ramp signal RAMP[N] which gradually decreases, the first switching element M1 may be turned off and the light emitting element EE may stop emitting a light.

In an initial portion of the fourth period DR4, a voltage of the emission signal EM[N] is changed from the inactive level VEMH to the active level VEML, the voltage of the second node NB may be changed from ELVDD to ELVDD−(VEMH−VEML) by the second capacitor C2. The voltage of the first node NA may be VDATA[N]+(VRAMPH−VRAMPL) in the third period DR3.

When the second switching element M2 is not turned on, a source-gate voltage of the first switching element M1 may be VEMH-VEML, and accordingly, the first switching element M1 is turned on and the light emitting element EE emits a light in the light emission on period of the fourth period DR4.

In the fourth period DR4, the ramp signal RAMP[N] may decrease at a constant rate from the maximum level VRAMPH toward the minimum level VRAMPL and the voltage of first node NA may also decrease due to a coupling of the first capacitor C1.

When the voltage of the first node NA continues to decrease and the source-gate voltage of the second switching element M2 becomes greater than an absolute value of a threshold voltage of the second switching element M2, the second switching element M2 may be turned on.

When the second switching element M2 is turned on, the voltage of the second node NB may be changed to the first power voltage ELVDD. When the voltage of the second node NB becomes the first power voltage ELVDD, both of the source voltage of the first switching element M1 and the gate voltage of the first switching element M1 becomes the first power voltage ELVDD such that the first switching element M1 may be turned off and the light emitting element EE may stop emitting a light.

According to an embodiment, the pixel circuit may include the light emitting element EE, the first switching element M1, the second switching element M2, the third switching element M3, the driving element MCC, the first capacitor C1 and the second capacitor C2 and the pixel circuit may be driven in the pulse width modulation method.

In the light emission on period, the first switching element M1 may be turned on and the second switching element M2 may be turned off such that the light emitting element EE may emit a light through a current path generated along the driving element MCC, the first switching element M1 and the light emitting element EE. When the second switching element M2 is turned on by the ramp signal RAMP[N] which gradually decreases, the first switching element M1 may be turned off and the light emitting element EE may stop emitting a light.

A conventional pixel circuit driven in a pulse width modulation method may have a relatively long falling time such that it may be very difficult to display low grayscale ranges and a color shift may occur due to a shift in a wavelength of a light emitting element. However, in an embodiment of the invention, the current of the light emitting element EE may be quickly controlled by the second switching element M2.

In addition, in a conventional pixel circuit driven by changing a level of a high power voltage ELVDD of the pixel circuit, a switch may be used for each pixel row to switch the high power voltage ELVDD and a voltage drop (IR-drop) of the high power voltage ELVDD may occur due to a large turn-on resistance of the switch. However, in an embodiment of the invention, the high power voltage ELVDD may not be switched such that the voltage drop may be effectively prevented.

Figure 12:
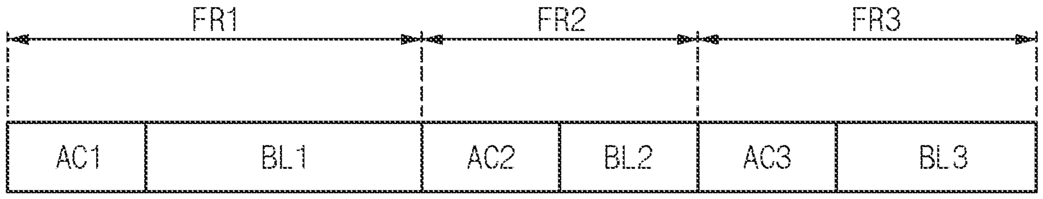
FIG. 12 is a diagram illustrating a variable frequency driving method of a display panel of FIG. 1.
Figure 13A:
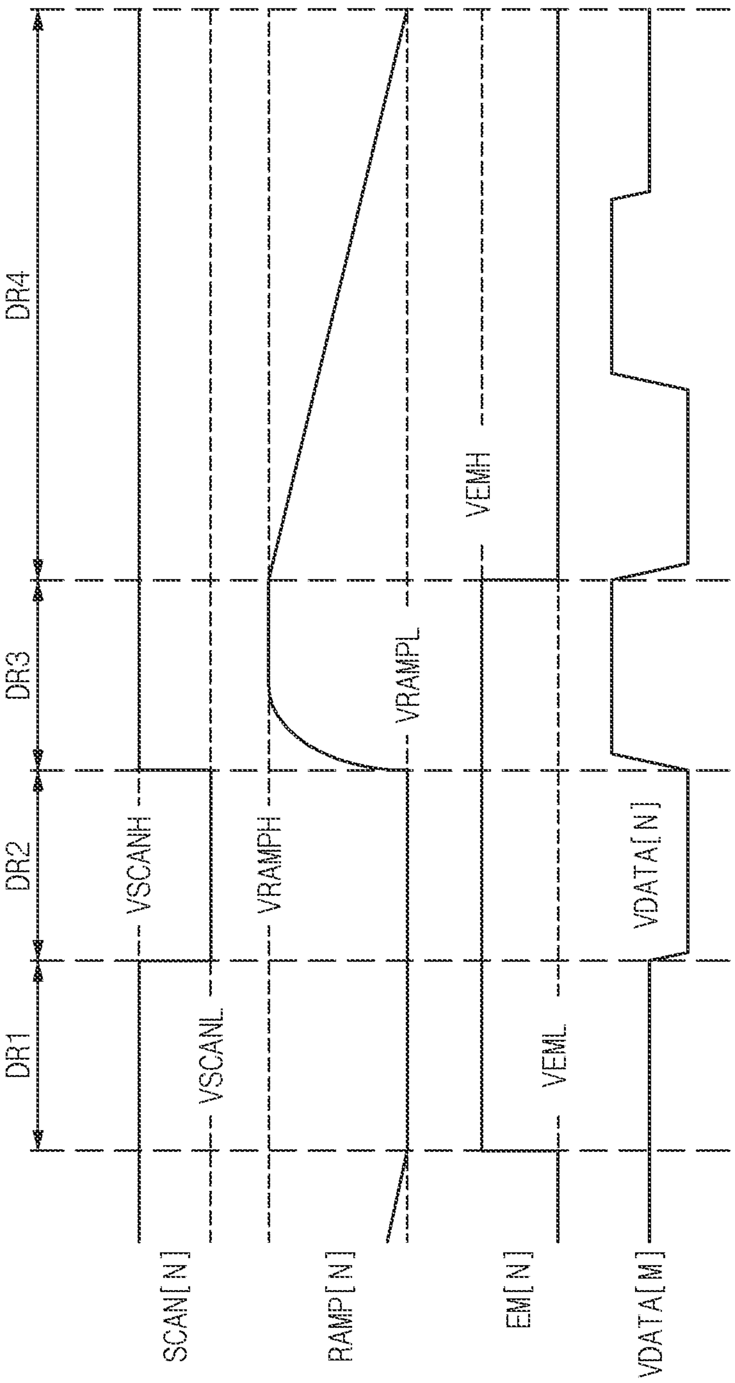
FIG. 13A is a signal timing diagram illustrating input signals applied to the pixel circuit of FIG. 2 in a writing frame.
Figure 13B:
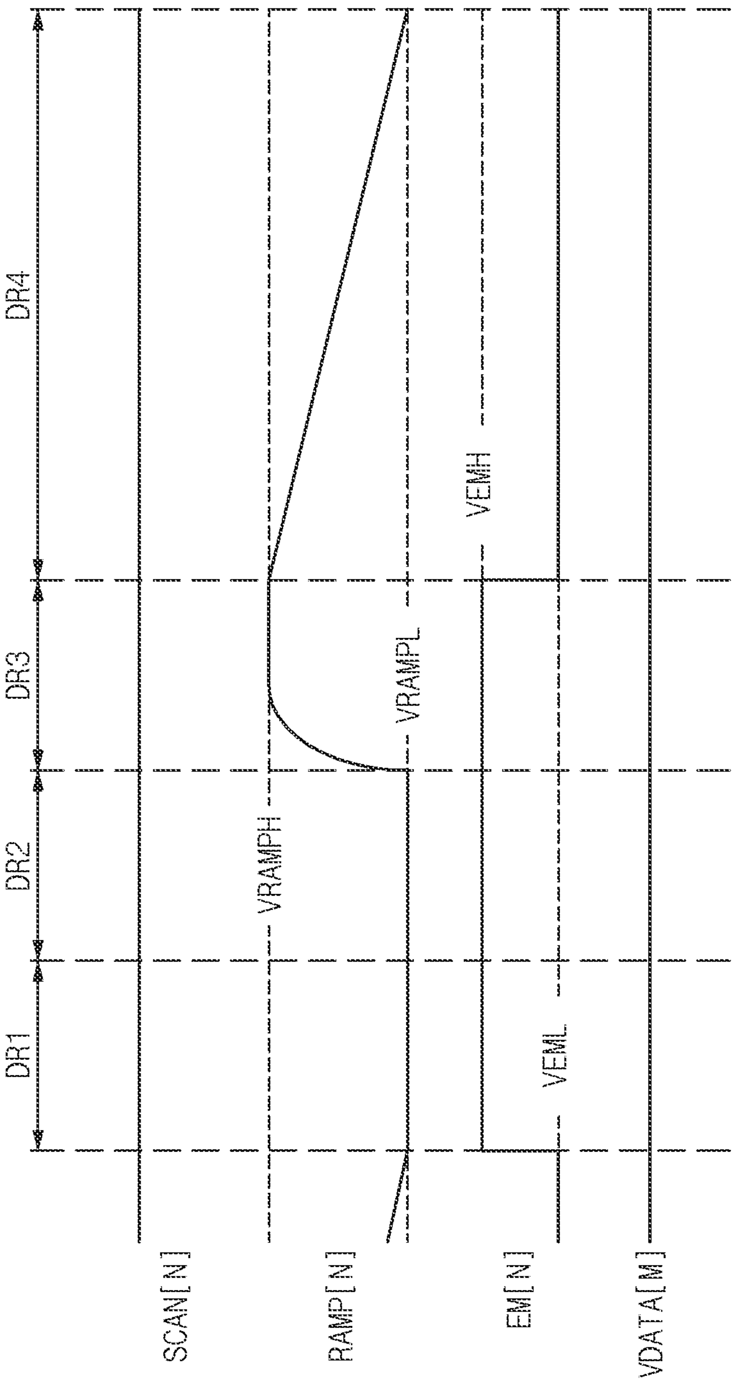
FIG. 13B is a signal timing diagram illustrating the input signals applied to the pixel circuit of FIG. 2 in a holding frame.

FIG. 12 is a diagram illustrating a variable frequency driving method of a display panel 100 of FIG. 1. FIG. 13A is a signal timing diagram illustrating input signals applied to the pixel circuit of FIG. 2 in a writing frame. FIG. 13B is a signal timing diagram illustrating the input signals applied to the pixel circuit of FIG. 2 in a holding frame.

A driving period of a pixel circuit of a display panel according to an embodiment shown in FIGS. 12 to 13B may be substantially the same as the driving period of the embodiments described above referring to FIGS. 3, 5, 7, 9 and 11. Thus, the same reference numerals will be used to refer to the same or like elements as those described above, and any repetitive detailed description thereof will be omitted.

Referring to FIGS. 1, 2 and 12 to 13B, in an embodiment, the display panel 100 may be driven in a variable frequency. A first frame FR1 having a first frequency may include a first active period AC1 and a first blank period BL1. A second frame FR2 having a second frequency different from the first frequency may include a second active period AC2 and a second blank period BL2. A third frame FR3 having a third frequency different from the first frequency and the second frequency may include a third active period AC3 and a third blank period BL3.

A length of the first active period AC1 may be substantially the same as a length of the second active period AC2. A length of the first blank period BL1 may be different from a length of the second blank period BL2.

The length of the second active period AC2 may be substantially the same as a length of the third active period AC3. The length of the second blank period BL2 may be different from a length of the third blank period BL3.

A driving period of the display apparatus supporting the variable frequency driving method may include a writing frame, in which the data voltage is written to the pixel, and a holding frame, in which the data voltage is not written to the pixel and the pixel emits a light. The writing frame may be included in the active period AC1, AC2 and AC3. The holding frame may be included in the blank period BL1, BL2 and BL3.

In an embodiment, for example, the data voltage VDATA[N] may be written to the second electrode of the first capacitor C1 and the light emitting element EE may emit a light in the writing frame. In an embodiment, for example, the data voltage VDATA[N] may not be written to the second electrode of the first capacitor C1 and the light emitting element EE may emit a light in the holding frame.

In the driving period of the writing frame, as shown in FIG. 13A, a first period DR1 may be an initialization period, a second period DR2 may be a programming period, a third period DR3 may be a maintaining period and a fourth period DR4 may be a light emission period. The driving period of FIG. 13A may be substantially the same as the driving period of FIGS. 3, 5, 7, 9 and 11.

In the driving period of the holding frame, as shown in FIG. 13B, a first period DR1 may be an initialization period, a second period DR2 may be a programming period, a third period DR3 may be a maintaining period and a fourth period DR4 may be a light emission period.

In the holding frame, the gate signal SCAN[N] may maintain an inactive level and the data voltage VDATA[M] may maintain a constant value.

In an embodiment, for example, in the first period DR1 of the writing frame, the gate signal SCAN[N] may have an inactive level, the ramp signal RAMP[N] may have a minimum level and the emission signal EM[N] may have an inactive level. In the second period DR2 of the writing frame subsequent to the first period DR1 of the writing frame, the gate signal SCAN[N] may have an active level, the ramp signal RAMP[N] may have the minimum level and the emission signal EM[N] may have the inactive level. In the third period DR3 of the writing frame subsequent to the second period DR2 of the writing frame, the gate signal SCAN[N] may have the inactive level, the ramp signal RAMP[N] may increase from the minimum level toward a maximum level and the emission signal EM[N] may have the inactive level. In the fourth period DR4 of the writing frame subsequent to the third period DR3 of the writing frame, the gate signal SCAN[N] may have the inactive level, the ramp signal RAMP[N] may gradually decrease from the maximum level toward the minimum level and the emission signal EM[N] may have the active level.

In an embodiment, for example, in the first period DR1 of the holding frame, the gate signal SCAN[N] may have an inactive level, the ramp signal RAMP[N] may have a minimum level and the emission signal EM[N] may have an inactive level. In the second period DR2 of the holding frame subsequent to the first period DR1 of the holding frame, the gate signal SCAN[N] may have the inactive level, the ramp signal RAMP[N] may have the minimum level and the emission signal EM[N] may have the inactive level. In the third period DR3 of the holding frame subsequent to the second period DR2 of the holding frame, the gate signal SCAN[N] may have the inactive level, the ramp signal RAMP[N] may increase from the minimum level toward a maximum level and the emission signal EM[N] may have the inactive level. In the fourth period DR4 of the holding frame subsequent to the third period DR3 of the holding frame, the gate signal SCAN[N] may have the inactive level, the ramp signal RAMP[N] may gradually decrease from the maximum level toward the minimum level and the emission signal EM[N] may have the active level.

According to an embodiment, the pixel circuit may include the light emitting element EE, the first switching element M1, the second switching element M2, the third switching element M3, the driving element MCC, the first capacitor C1 and the second capacitor C2 and may be driven in the pulse width modulation method.

In the light emission on period, the first switching element M1 may be turned on and the second switching element M2 may be turned off such that the light emitting element EE may emit a light through a current path generated along the driving element MCC, the first switching element M1 and the light emitting element EE. When the second switching element M2 is turned on by the ramp signal RAMP[N] which gradually decreases, the first switching element M1 may be turned off and the light emitting element EE may stop emitting a light.

A conventional pixel circuit driven in a pulse width modulation method may have a relatively long falling time such that it may be very difficult to display low grayscale ranges and a color shift may occur due to a shift in a wavelength of a light emitting element. However, in an embodiment of the invention, the current of the light emitting element EE may be quickly controlled by the second switching element M2.

In addition, in a conventional pixel circuit driven by changing a level of a high power voltage ELVDD of the pixel circuit, a switch may be used for each pixel row to switch the high power voltage ELVDD and a voltage drop (IR-drop) of the high power voltage ELVDD may occur due to a large turn-on resistance of the switch. However, in an embodiment of the invention, the high power voltage ELVDD may not be switched such that the voltage drop may be effectively prevented.

In addition, in an embodiment of the invention, the pixel circuit may support the variable frequency driving method such that the power consumption of the display apparatus may be reduced.

Figure 14:
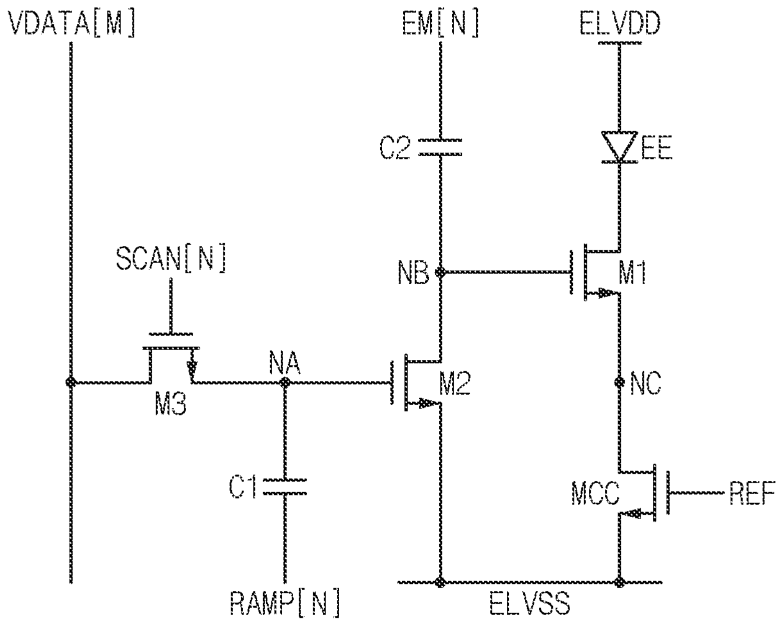
FIG. 14 is a circuit diagram illustrating a pixel circuit of a display panel of a display apparatus according to an embodiment of the invention.
Figure 15:
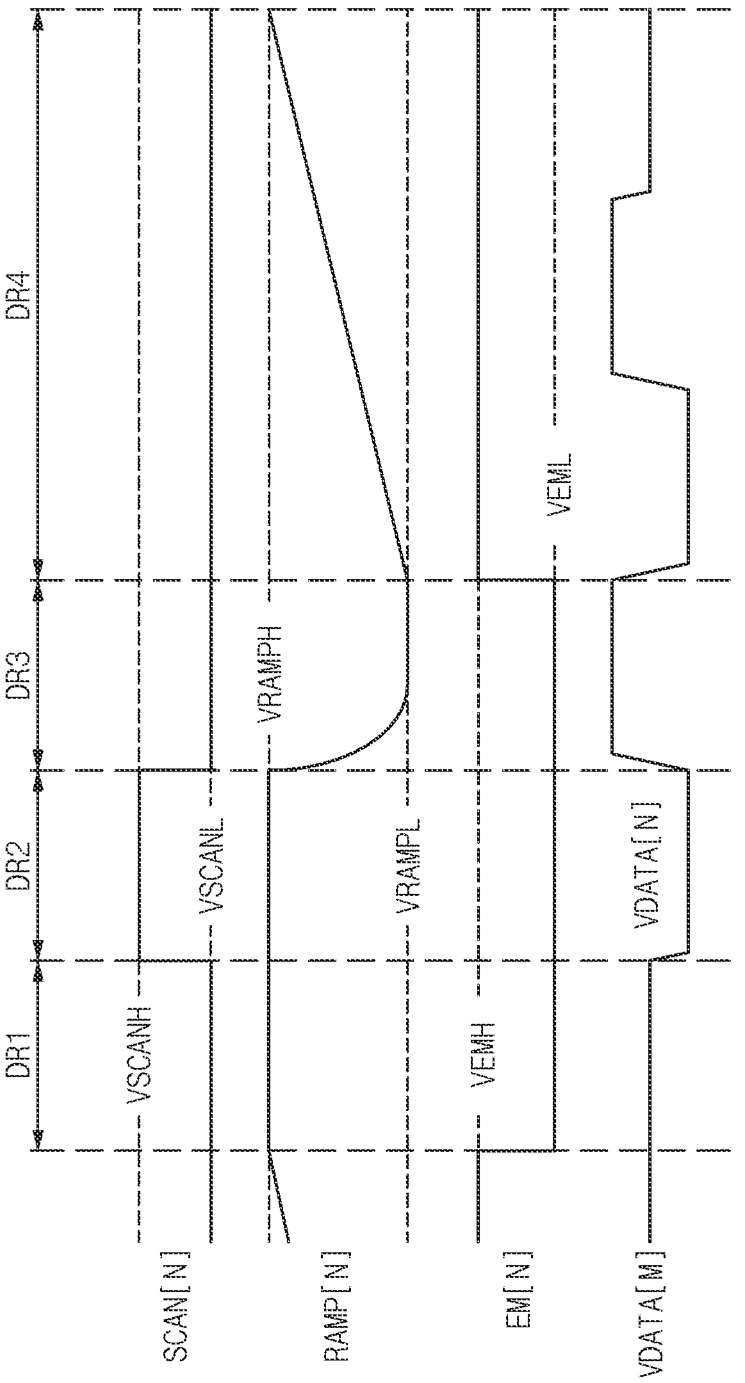
FIG. 15 is a signal timing diagram illustrating input signals applied to the pixel circuit of FIG. 14.

FIG. 14 is a circuit diagram illustrating a pixel circuit of a display panel of a display apparatus according to an embodiment of the invention. FIG. 15 is a signal timing diagram illustrating input signals applied to the pixel circuit of FIG. 14.

Referring to FIGS. 1, 14 and 15, in an embodiment of the pixel circuit of the embodiment, the first switching element M1, the second switching element M2, the third switching element M3 and the driving element MCC may be N-type transistors. In an embodiment, for example, the first switching element M1, the second switching element M2, the third switching element M3 and the driving element MCC may be oxide semiconductor transistors.

The pixel circuit includes a light emitting element EE, a first switching element M1, a second switching element M2, a third switching element M3, a driving element MCC, a first capacitor C1 and a second capacitor C2.

The light emitting element EE may include an anode electrode that receives a first power voltage ELVDD and a cathode electrode connected to a first electrode of the first switching element M1.

The first switching element M1 includes a control electrode connected to a second node NB, a first electrode connected to a cathode electrode of the light emitting element EE and a second electrode connected to a third node NC.

The second switching element M2 includes a control electrode connected to a first node NA, a first electrode connected to the second node NB and a second electrode that receives a second power voltage ELVSS.

The third switching element M3 includes a control electrode that receives a gate signal SCAN[N], a first electrode that receives a data voltage VDATA[M] and a second electrode connected to the first node NA.

The driving element MCC includes a control electrode that receives a reference voltage REF, a first electrode connected to the third node NC and a second electrode that receives the second power voltage ELVSS.

The first capacitor C1 includes a first electrode that receives a ramp signal RAMP[N] and a second electrode connected to the first node NA.

The second capacitor C2 includes a first electrode that receives an emission signal EM[N] and a second electrode connected to the second node NB.

The first power voltage ELVDD and the second power voltage ELVSS may be power voltages for a light emission of the light emitting element EE. In an embodiment, for example, the first power voltage ELVDD may be greater than the second power voltage ELVSS.

A driving period of the pixel circuit may include a first period DR1, a second period DR2, a third period DR3 and a fourth period DR4.

The first period DR1 may be an initialization period. In the first period DR1, the voltage of the second node NB may be initialized.

The second period DR2 may be a programming period. In the second period DR2, the data voltage VDATA[M] may be applied to the first node NA.

The third period DR3 may be a maintaining period. In the third period DR3 may be a time for the ramp signal RAMP[N] to decrease sufficiently to a minimum level.

The fourth period DR4 may be alight emission period. In the fourth period DR4, the emission signal EM[N] has an active level and the ramp signal RAMP[N] gradually increases from the minimum level to a maximum level. In a light emission on period of the fourth period DR4, the light emitting element EE may emit a light. In a light emission off period of the fourth period DR4, the light emitting element EE may not emit a light.

In the first period DR1, the gate signal SCAN[N] may have an inactive level VSCANL, the ramp signal RAMP[N] may have the maximum level VRAMPH and the emission signal EM[N] may have an inactive level VEML.

In an embodiment, where transistors that receives the gate signal SCAN[N], the ramp signal RAMP[N] and the emission signal EM[N] are P-type transistors, active levels of the gate signal SCAN[N], the ramp signal RAMP[N] and the emission signal EM[N] may be low levels and inactive levels of the gate signal SCAN[N], the ramp signal RAMP [N] and the emission signal EM[N] may be high levels. In another embodiment, where transistors that receives the gate signal SCAN[N], the ramp signal RAMP[N] and the emission signal EM[N] are N-type transistors, active levels of the gate signal SCAN[N], the ramp signal RAMP[N] and the emission signal EM[N] may be high levels and inactive levels of the gate signal SCAN[N], the ramp signal RAMP [N] and the emission signal EM[N] may be low levels.

For example, a low level of the gate signal SCAN[N] may be VSCANL and a high level of the gate signal SCAN[N] may be VSCANH.

For example, a low level of the ramp signal RAMP[N] may be VRAMPL and a high level of the ramp signal RAMP[N] may be VRAMPH.

For example, a low level of the emission signal EM[N] may be VEML and a high level of the emission signal EM[N] may be VEMH.

In the second period DR2 subsequent to the first period DR1, the gate signal SCAN[N] may have an active level VSCANH, the ramp signal RAMP[N] may have the maximum level VRAMPH and the emission signal EM[N] may have the inactive level VEML.

In the third period DR3 subsequent to the second period DR2, the gate signal SCAN[N] may have the inactive level VSCANL, the ramp signal RAMP[N] may decrease from the maximum level VRAMPH toward the minimum level VRAMPL and the emission signal EM[N] may have the inactive level VEML.

In the fourth period DR4 subsequent to the third period DR3, the gate signal SCAN[N] may have the inactive level VSCANL, the ramp signal RAMP[N] may gradually increase from the minimum level VRAMPL toward the maximum level VRAMPH and the emission signal EM[N] may have the active level VEMH.

In the light emission on period, the first switching element M1 may be turned on and the second switching element M2 may be turned off such that the light emitting element EE may emit a light through a current path generated along the driving element MCC, the first switching element M1 and the light emitting element EE. When the second switching element M2 is turned on by the ramp signal RAMP[N] which gradually increases, the first switching element M1 may be turned off and the light emitting element EE may stop emitting a light.

According to an embodiment, the pixel circuit may include the light emitting element EE, the first switching element M1, the second switching element M2, the third switching element M3, the driving element MCC, the first capacitor C1 and the second capacitor C2 and may be driven in the pulse width modulation method.

In the light emission on period, the first switching element M1 may be turned on and the second switching element M2 may be turned off such that the light emitting element EE may emit a light through a current path generated along the driving element MCC, the first switching element M1 and the light emitting element EE. When the second switching element M2 is turned on by the ramp signal RAMP[N] which gradually decreases, the first switching element M1 may be turned off and the light emitting element EE may stop emitting a light.

A conventional pixel circuit driven in a pulse width modulation method may have a relatively long falling time such that it may be very difficult to display low grayscale ranges and a color shift may occur due to a shift in a wavelength of a light emitting element. However, in an embodiment of the invention, the current of the light emitting element EE may be quickly controlled by the second switching element M2.

In addition, in a conventional pixel circuit driven by changing a level of a high power voltage ELVDD of the pixel circuit, a switch may be used for each pixel row to switch the high power voltage ELVDD and a voltage drop (IR-drop) of the high power voltage ELVDD may occur due to a large turn-on resistance of the switch. However, in an embodiment of the invention, the high power voltage ELVDD may not be switched so that the voltage drop may be effectively prevented.

Figure 16:
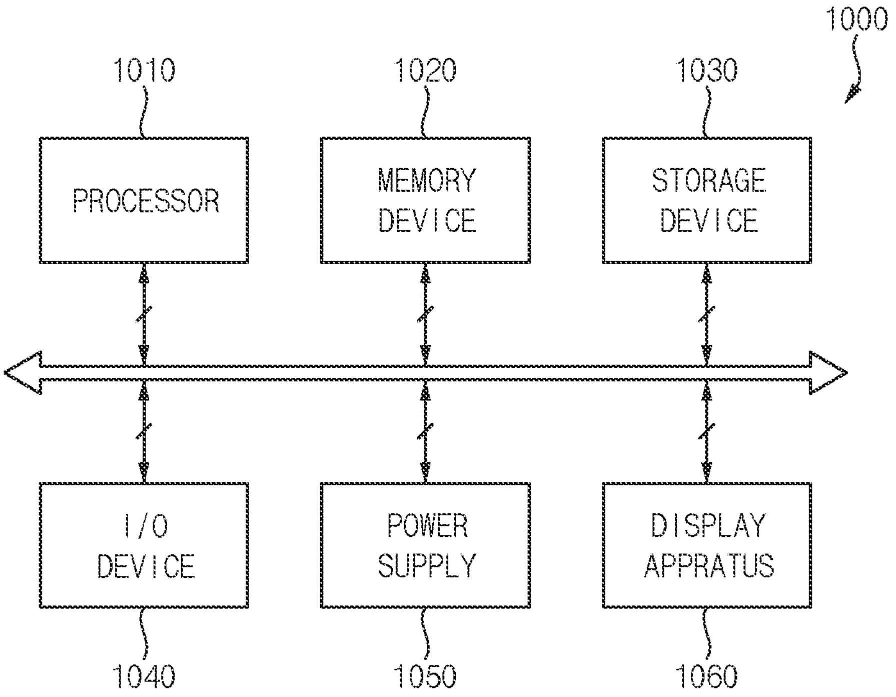
FIG. 16 is a block diagram illustrating an electronic apparatus according to an embodiment of the invention.
Figure 17:
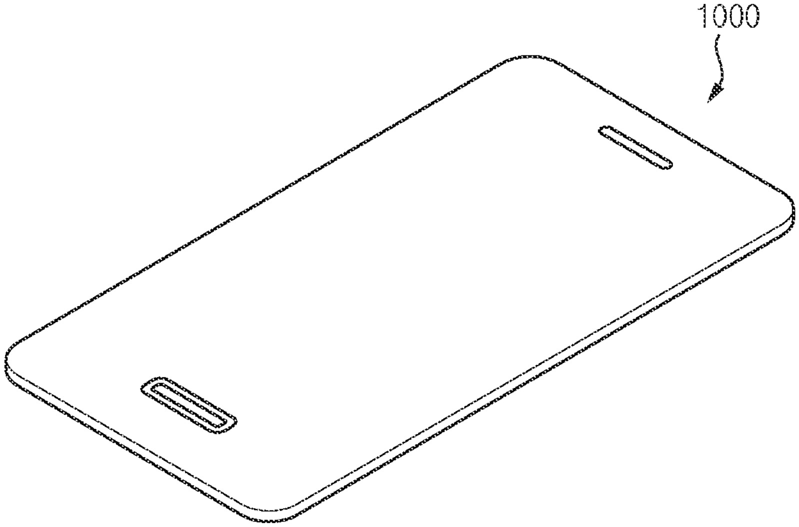
FIG. 17 is a diagram illustrating an embodiment in which the electronic apparatus of FIG. 16 is implemented as a smart phone.

FIG. 16 is a block diagram illustrating an electronic apparatus 1000 according to an embodiment of the invention. FIG. 17 is a diagram illustrating an embodiment in which the electronic apparatus 1000 of FIG. 16 is implemented as a smart phone.

Referring to FIGS. 16 and 17, an embodiment of the electronic apparatus 1000 may include a processor 1010, a memory device 1020, a storage device 1030, an input/output (I/O) device 1040, a power supply 1050 and a display apparatus 1060. Here, the display apparatus 1060 may be the display apparatus of FIG. 1. In addition, the electronic apparatus 1000 may further include a plurality of ports for communicating with a video card, a sound card, a memory card, a universal serial bus (USB) device, other electronic apparatuses, etc.

In an embodiment, as illustrated in FIG. 17, the electronic apparatus 1000 may be implemented as a smart phone. However, the electronic apparatus 1000 is not limited thereto. In an embodiment, for example, the electronic apparatus 1000 may be implemented as a cellular phone, a video phone, a smart pad, a smart watch, a tablet computer, a car navigation system, a computer monitor, a laptop, a head mounted display (HMD) device, or the like.

The processor 1010 may perform various computing functions or various tasks. The processor 1010 may be a micro-processor, a central processing unit (CPU), an application processor (AP), or the like. The processor 1010 may be coupled to other components via an address bus, a control bus, a data bus, etc. Further, the processor 1010 may be coupled to an extended bus such as a peripheral component interconnection (PCI) bus.

The processor 1010 may output the input image data IMG and the input control signal CONT to the driving controller 200 of FIG. 1.

The memory device 1020 may store data for operations of the electronic apparatus 1000. In an embodiment, for example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, or the like and/or at least one volatile memory device such as a dynamic random access memory (DRAM) device, a static random access memory (SRAM) device, a mobile DRAM device, or the like.

The storage device 1030 may include a solid state drive (SSD) device, a hard disk drive (HDD) device, a CD-ROM device, or the like. The I/O device 1040 may include an input device such as a keyboard, a keypad, a mouse device, a touch-pad, a touch-screen, or the like and an output device such as a printer, a speaker, or the like. In some embodiments, the display apparatus 1060 may be included in the I/O device 1040. The power supply 1050 may provide power for operations of the electronic apparatus 1000. The display apparatus 1060 may be coupled to other components via the buses or other communication links.

Figure 18:
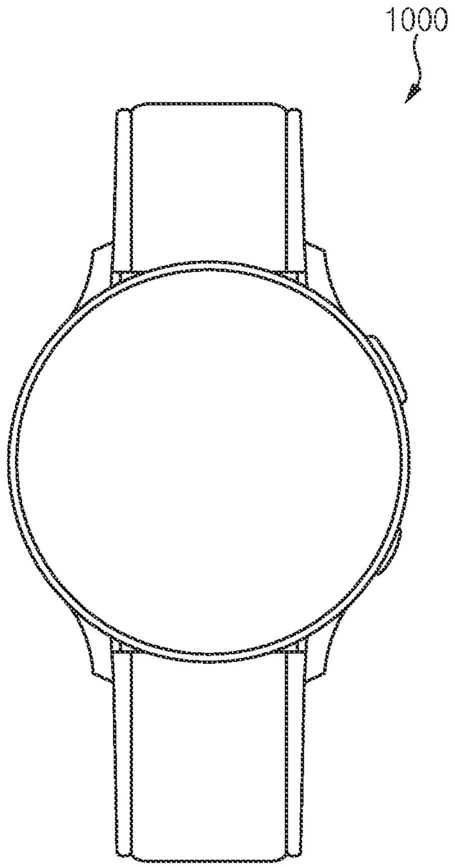
FIG. 18 is a diagram illustrating an embodiment in which the electronic apparatus of FIG. 16 is implemented as a smart watch.

FIG. 18 is a diagram illustrating an embodiment in which the electronic apparatus 1000 of FIG. 16 is implemented as a smart watch.

Referring to FIGS. 16 and 18, an embodiment of the electronic apparatus 1000 may be implemented as the smart watch. The smart watch may be an example of the electronic apparatus 1000 including a micro light emitting diode.

Figure 19:
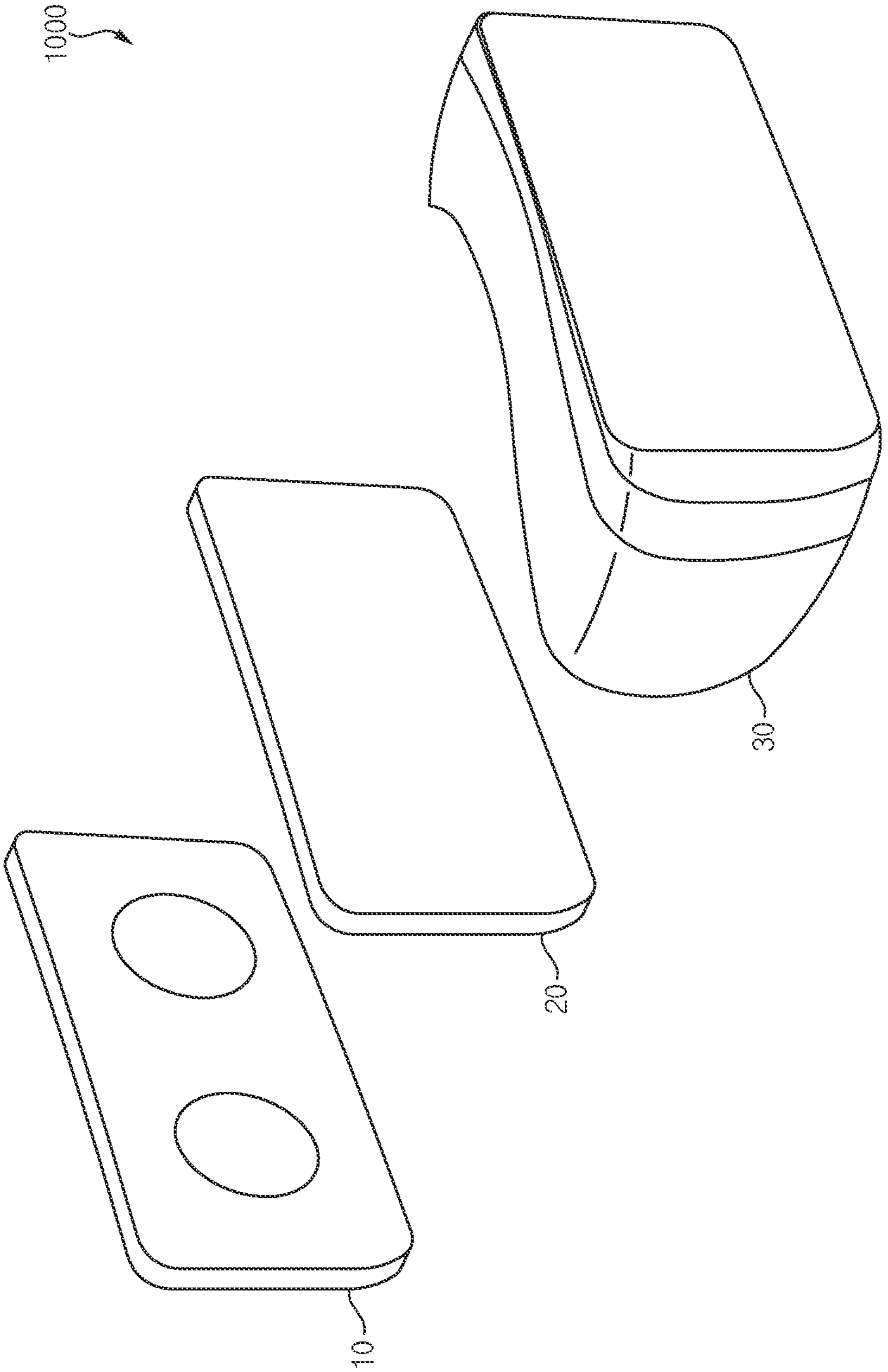
FIG. 19 is a diagram illustrating an embodiment in which the electronic apparatus of FIG. 16 is implemented as a head mounted display system.

FIG. 19 is a diagram illustrating an embodiment in which the electronic apparatus 1000 of FIG. 16 is implemented as a head mounted display system.

Referring to FIGS. 16 and 19, an embodiment of the electronic apparatus 1000 may be implemented as the head mounted display system. The head mounted display system may be an example of the electronic apparatus 1000 including a micro light emitting diode.

The head mounted display system may include a lens 10, a display apparatus 20 and a housing 30. The display apparatus 20 may be disposed adjacent to the lens 10. The housing 30 may receive the lens 10 and the display apparatus 20. Although the lens 10 and the display apparatus 20 are received on a first side of the housing 30 in FIG. 19, the invention may not be limited thereto.

In an embodiment, for example, the lens 10 may be received on a first side of the housing 30 and the display apparatus 20 may be received on a second side of the housing 30 opposite to the first side of the housing 30. In an embodiment where the lens 10 and the display apparatus 20 are received on opposite sides with respect to the housing 30, the housing 30 may have a transmitting portion to transmit a light.

Although not shown in figures, the head mounted display system may further include a head band to fix the display system to the user's head.

Alternatively, the head mounted display system may have a form of smart glasses designed as a shape of glasses.

For example, the head mounted display system may be implemented as a virtual reality (VR) display system for supporting a virtual reality.

In addition, the head mounted display system may be implemented as an augmented reality (AR) display system for supporting an augmented reality. The AR display system may have a smartphone shape, a smart glasses shape, a head mounted display shape, etc., but may not be limited to those shapes.

In addition, the head mounted display system may be implemented as a mixed reality (MR) display system for supporting a mixed reality. The MR display system may have a smartphone shape, a smart glasses shape, a head mounted display shape, etc., but may not be limited to those shapes.

In the pixel circuit, the display apparatus and the electronic apparatus according to embodiments of the invention as described above, the pixel circuit may be effectively driven in the pulse width modulation method.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A pixel circuit comprising:

a light emitting element;

a first switching element including a control electrode connected to a second node, a first electrode connected to a third node and a second electrode connected to an anode electrode of the light emitting element;

a second switching element including a control electrode connected to a first node, a first electrode which receives a first power voltage and a second electrode connected to the second node;

a third switching element including a control electrode which receives a gate signal, a first electrode which receives a data voltage and a second electrode connected to the first node;

a driving element including a control electrode which receives a reference voltage, a first electrode which receives the first power voltage and a second electrode connected to the third node;

a first capacitor including a first electrode which receives a ramp signal and a second electrode connected to the first node; and a second capacitor including a first electrode which receives an emission signal and a second electrode connected to the second node.

2. The pixel circuit of claim 1, wherein the first switching element, the second switching element, the third switching element and the driving element are P-type transistors.

3. The pixel circuit of claim 1, wherein the gate signal has an inactive level in a first period, wherein the ramp signal has a minimum level in the first period, and wherein the emission signal has an inactive level in the first period.

4. The pixel circuit of claim 3, wherein the gate signal has an active level in a second period subsequent to the first period, wherein the ramp signal has the minimum level in the second period, and wherein the emission signal has the inactive level in the second period.

5. The pixel circuit of claim 4, wherein the gate signal has the inactive level in a third period subsequent to the second period, wherein the ramp signal increases from the minimum level toward a maximum level in the third period, and wherein the emission signal has the inactive level in the third period.

6. The pixel circuit of claim 5, wherein the gate signal has the inactive level in a fourth period subsequent to the third period, wherein the ramp signal gradually decreases from the maximum level toward the minimum level in the fourth period, and wherein the emission signal has an active level in the fourth period.

7. The pixel circuit of claim 1, wherein a light emission time of the light emitting element is determined based on the data voltage and a difference between a maximum level of the ramp signal and a minimum level of the ramp signal.

8. The pixel circuit of claim 1, wherein in a light emission on period, the first switching element is turned on, the second switching element is turned off, and the light emitting element emits a light through a current path generated along the driving element, the first switching element and the light emitting element, and wherein when the second switching element is turned on by the ramp signal which gradually decreases, the first switching element is turned off and the light emitting element stops emitting the light.

9. The pixel circuit of claim 1, wherein the light emitting element further includes a cathode electrode which receives a second power voltage, wherein the ramp signal, the gate signal and the emission signal vary according to time in a first period to a fourth period, and wherein the first power voltage, the second power voltage and the reference voltage is constant in the first period to the fourth period.

10. The pixel circuit of claim 1, wherein the data voltage is written to the second electrode of the first capacitor and the light emitting element emits a light in a writing frame, wherein the data voltage is not written to the second electrode of the first capacitor and the light emitting element emits the light in a holding frame, wherein the gate signal has an inactive level in a first period of the writing frame, wherein the ramp signal has a minimum level in the first period of the writing frame, wherein the emission signal has an inactive level in the first period of the writing frame, wherein the gate signal has an active level in a second period of the writing frame, wherein the ramp signal has the minimum level in the second period of the writing frame, wherein the emission signal has the inactive level in the second period of the writing frame, wherein the gate signal has the inactive level in a third period of the writing frame, wherein the ramp signal increases from the minimum level toward a maximum level in the third period of the writing frame, wherein the emission signal has the inactive level in the third period of the writing frame, wherein the gate signal has the inactive level in a fourth period of the writing frame, wherein the ramp signal gradually decreases from the maximum level toward the minimum level in the fourth period of the writing frame, and wherein the emission signal has an active level in the fourth period of the writing frame.

11. The pixel circuit of claim 10, wherein the gate signal has an inactive level in a first period of the holding frame, wherein the ramp signal has a minimum level in the first period of the holding frame, wherein the emission signal has an inactive level in the first period of the holding frame, wherein the gate signal has the inactive level in a second period of the holding frame, wherein the ramp signal has the minimum level in the second period of the holding frame, wherein the emission signal has the inactive level in the second period of the holding frame, wherein the gate signal has the inactive level in a third period of the holding frame, wherein the ramp signal increases from the minimum level toward a maximum level in the third period of the holding frame, wherein the emission signal has the inactive level in the third period of the holding frame, wherein the gate signal has the inactive level in a fourth period of the holding frame, wherein the ramp signal gradually decreases from the maximum level toward the minimum level in the fourth period of the holding frame, and wherein the emission signal has an active level in the fourth period of the holding frame.

12. A pixel circuit comprising:

a light emitting element;

a first switching element including a control electrode connected to a second node, a first electrode connected to a cathode electrode of the light emitting element and a second electrode connected to a third node;

a second switching element including a control electrode connected to a first node, a first electrode connected to the second node and a second electrode which receives a second power voltage;

a third switching element including a control electrode which receives a gate signal, a first electrode which receives a data voltage and a second electrode connected to the first node;

a driving element including a control electrode which receives a reference voltage, a first electrode connected to the third node and a second electrode which receives the second power voltage;

a first capacitor including a first electrode which receives a ramp signal and a second electrode connected to the first node; and a second capacitor including a first electrode which receives an emission signal and a second electrode connected to the second node.

13. The pixel circuit of claim 12, wherein the first switching element, the second switching element, the third switching element and the driving element are N-type transistors.

14. The pixel circuit of claim 12, wherein the gate signal has an inactive level in a first period, wherein the ramp signal has a maximum level in the first period, and wherein the emission signal has an inactive level in the first period.

15. The pixel circuit of claim 14, wherein the gate signal has an active level in a second period subsequent to the first period, wherein the ramp signal has the maximum level in the second period, and wherein the emission signal has the inactive level in the second period.

16. The pixel circuit of claim 15, wherein the gate signal has the inactive level in a third period subsequent to the second period, wherein the ramp signal decreases from the maximum level toward a minimum level in the third period, and wherein the emission signal has the inactive level in the third period.

17. The pixel circuit of claim 16, wherein the gate signal has the inactive level in a fourth period subsequent to the third period, wherein the ramp signal gradually increases from the minimum level toward the maximum level in the fourth period, and wherein the emission signal has an active level in the fourth period.

18. The pixel circuit of claim 12, wherein a light emission time of the light emitting element is determined based on the data voltage and a difference between a maximum level of the ramp signal and a minimum level of the ramp signal.

19. The pixel circuit of claim 12, wherein in a light emission on period, the first switching element is turned on, the second switching element is turned off and the light emitting element emits a light through a current path generated along the driving element, the first switching element and the light emitting element, and wherein when the second switching element is turned on by the ramp signal which gradually increases, the first switching element is turned off and the light emitting element stops emitting the light.

20. An electronic apparatus comprising:

a display panel comprising a pixel;

a data driver which outputs a data voltage to the pixel;

a gate emission driver which outputs a gate signal and an emission signal to the pixel;

a ramp driver which outputs a ramp signal to the pixel;

a driving controller which controls the data driver, the gate emission driver and the ramp driver; and a processor which outputs input image data and an input control signal to the driving controller;

wherein the pixel comprises:

a light emitting element;

a first switching element including a control electrode connected to a second node, a first electrode connected to a third node and a second electrode connected to an anode electrode of the light emitting element;

a second switching element including a control electrode connected to a first node, a first electrode which receives a first power voltage and a second electrode connected to the second node;

a third switching element including a control electrode which receives the gate signal, a first electrode which receives the data voltage and a second electrode connected to the first node;

a driving element including a control electrode which receives a reference voltage, a first electrode which receives the first power voltage and a second electrode connected to the third node;

a first capacitor including a first electrode which receives the ramp signal and a second electrode connected to the first node; and a second capacitor including a first electrode which receives the emission signal and a second electrode connected to the second node.

* * * * *